US009100988B2

(12) United States Patent
Vilmur et al.

(10) Patent No.: US 9,100,988 B2
(45) Date of Patent: Aug. 4, 2015

(54) MOBILE REPEATER SYSTEM BASED AD HOC TRUNKED SITES

(71) Applicant: MOTOROLA SOLUTIONS, INC., Schaumburg, IL (US)

(72) Inventors: Roger M. Vilmur, Palatine, IL (US); Eilon Eyal, Galil Elyon (IL); Leslie G. Gustafson, Oakwood Hills, IL (US); Doron Nadjar, Ben Shemen (IL); Salomon Serfaty, Gaash (IL)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 436 days.

(21) Appl. No.: 13/657,104

(22) Filed: Oct. 22, 2012

(65) Prior Publication Data

US 2014/0112242 A1   Apr. 24, 2014

(51) Int. Cl.
H04W 84/18   (2009.01)

(52) U.S. Cl.
CPC ..................................... *H04W 84/18* (2013.01)

(58) Field of Classification Search
CPC ....... H04W 4/08; H04W 8/186; H04W 40/32; H04W 40/20; H04W 84/005; H04W 84/08; H04W 84/18; H04W 88/04; H04B 7/14; H04B 7/15; H04L 2001/0097
See application file for complete search history.

(56) References Cited

U.S. PATENT DOCUMENTS

| | | | |
|---|---|---|---|
| 5,040,237 A * | 8/1991 | Barnes et al. | 455/8 |
| 5,729,680 A | 3/1998 | Belanger et al. | |
| 6,141,533 A * | 10/2000 | Wilson et al. | 455/11.1 |
| 6,282,577 B1 | 8/2001 | Okanoue et al. | |
| 7,649,872 B2 | 1/2010 | Naghian et al. | |
| 7,711,319 B2 * | 5/2010 | Namm et al. | 455/11.1 |
| 8,255,684 B2 * | 8/2012 | Benshetler et al. | 713/156 |
| 8,843,058 B2 * | 9/2014 | Senarath et al. | 455/11.1 |
| 2004/0103275 A1 | 5/2004 | Ji et al. | |
| 2007/0297374 A1 * | 12/2007 | El-Damhougy | 370/338 |
| 2007/0299794 A1 * | 12/2007 | El-Damhougy | 706/15 |
| 2007/0299947 A1 * | 12/2007 | El-Damhougy | 709/223 |
| 2008/0037461 A1 | 2/2008 | Biltz et al. | |
| 2008/0207241 A1 * | 8/2008 | Namm et al. | 455/518 |

(Continued)

FOREIGN PATENT DOCUMENTS

| | | |
|---|---|---|
| GB | 2423888 A | 9/2006 |
| WO | 2004002208 A2 | 1/2004 |

(Continued)

OTHER PUBLICATIONS

PCT Internatiional Search Report Dated Jan. 2, 2014 for Counterpart Application US/PCT2013/063265.

*Primary Examiner* — Benjamin H Elliott, IV
*Assistant Examiner* — Eric Nowlin
(74) *Attorney, Agent, or Firm* — Daniel R. Bestor

(57) ABSTRACT

A first Mobile Repeater System (MRS), configured to serve as an access point associated with a Basic Service Set (BSS), broadcasts a Basic Service Set Identifier (BSSID). Other Mobile Repeater Systems (MRSs) join the BSS to create a local ad hoc trunked site in which each of the MRSs are communicatively coupled via at least one WLAN communication link. These MRSs include the first MRS and a second MRS. The first MRS can be configured to provide a control channel for communication with a first subscriber unit, and the second MRSs can be configured to provide a first trunked traffic channel for communication with the first subscriber unit.

13 Claims, 17 Drawing Sheets

(56) References Cited

U.S. PATENT DOCUMENTS

| | | |
|---|---|---|
| 2009/0116509 A1 | 5/2009 | Delaney |
| 2009/0207852 A1* | 8/2009 | Greene et al. .................. 370/465 |
| 2009/0219900 A1* | 9/2009 | Kokkinen et al. ............. 370/338 |
| 2010/0248619 A1* | 9/2010 | Senarath et al. ............. 455/11.1 |
| 2011/0225305 A1* | 9/2011 | Vedantham et al. .......... 709/227 |
| 2012/0051250 A1* | 3/2012 | Sun et al. ...................... 370/252 |
| 2014/0204832 A1* | 7/2014 | Van Phan et al. ............. 370/315 |

FOREIGN PATENT DOCUMENTS

| | | | | |
|---|---|---|---|---|
| WO | WO 2008084394 A3 * | 4/2011 | ............ | H04W 60/00 |
| WO | WO 2012171585 A1 * | 12/2012 | ............. | H04W 8/26 |

\* cited by examiner

FIG. 6E

STANDARDIZED QCIs FOR LTE

| QCI | RESOURCE TYPE | PRIORITY | PACKET DELAY BUDGET (MS) | PACKET ERROR LOSS RATE | EXAMPLE SERVICES |
|---|---|---|---|---|---|
| 1 | GBR | 2 | 100 | $10^{-2}$ | CONVERSATIONAL VOICE |
| 2 | GBR | 4 | 150 | $10^{-3}$ | CONVERSATIONAL VIDEO (LIVE STREAMING) |
| 3 | GBR | 5 | 300 | $10^{-6}$ | NON-CONVERSATIONAL VIDEO (BUFFERED STREAMING) |
| 4 | GBR | 3 | 50 | $10^{-3}$ | REAL-TIME GAMING |
| 5 | NON-GBR | 1 | 100 | $10^{-6}$ | IMS SIGNALING |
| 6 | NON-GBR | 7 | 100 | $10^{-3}$ | VOICE, VIDEO (LIVE STREAMING), INTERACTIVE GAMING |
| 7 | NON-GBR | 6 | 300 | $10^{-6}$ | VIDEO (BUFFERED STREAMING) |
| 8 | NON-GBR | 8 | 300 | $10^{-6}$ | TCP-BASED (FOR EXAMPLE, WWW, E-MAIL), CHAT, FTP, P2P FILE SHARING, PROGRESSIVE VIDEO AND OTHERS |
| 9 | NON-GBR | 9 | 300 | $10^{-6}$ | |

MOBILE REPEATER SYSTEM BASED AD HOC TRUNKED SITES

FIELD OF THE DISCLOSURE

The present disclosure relates generally to wireless communication networks, and more particularly to trunked communications within such wireless communication networks.

BACKGROUND

Land mobile radio systems are primarily utilized to provide communications to police officers, fire fighters and other emergency responders, and professional and commercial entities, such as retail store chains, school systems, utilities companies, transportation companies and construction companies, and the like. There are a number of two-way radio systems (also known as land mobile radio systems) that are either presently in use or currently being developed including digital radio technologies that are now available.

For instance, the Association of Public-Safety Communications Officials (APCO) Project 25 (P25) (or APCO-25) represents one effort to set standards for digital two-way radio technology. In general, P25 refers to a suite of narrowband digital Land Mobile Radio (LMR) communication standards for digital radio communications, equipment and systems. P25 standards are produced through the joint efforts of the Association of Public Safety Communications Officials International (APCO), the National Association of State Telecommunications Directors (NASTD), selected Federal Agencies and the National Communications System (NCS), and standardized under the Telecommunications Industry Association (TIA). P25-compliant technology is being deployed in phases commonly referred to as Phase 1 and Phase 2. Phase 2 systems are designed to help improve spectrum utilization. Among other changes to the Phase 1 standard, the Phase 2 standard proposes migration from Frequency-Division Multiple Access (FDMA)-based channel access scheme to a Time-Division Multiple Access (TDMA)-based channel access scheme. Further details regarding the P25 standards can be obtained from the Telecommunications Industry Association, 2500 Wilson Boulevard, Suite 300 Arlington, Va. 22201.

Mobile Repeater Systems (MRSs)

Land mobile radio systems typically include portable subscriber units (SUs) and a base station, and in some cases additional mobile repeater systems (MRSs). To explain further, a SU is usually sized so that it can be easily carried by a user. As such, SUs are typically powered by a small rechargeable battery, and have a relatively small antenna due to size constraints. For those reasons, SUs are generally designed to transmit at a relatively low power, and therefore, the operating range of a SU is limited. To overcome the range limitations associated with portable SUs, a communication system can often include one or more mobile repeater systems (MRSs).

A Mobile Repeater System (MRS) is a radio system component that includes a high-power mobile radio unit that can be used to extend radio coverage area of a fixed system, such as a trunked radio infrastructure. For example, MRSs are currently used in radio communication systems to provide coverage to portable subscriber units (SU) in areas where the coverage provided by the fixed system is insufficient. For instance, a MRS can be used when radio coverage to portable SUs is poor or would otherwise be unavailable (e.g., SUs that are in a marginal coverage area). In operation, a MRS can receive RF signals being transmitted to or from a portable SU, amplify these RF signals, and retransmit these signals at higher power to increase the range of the communication system, thus enabling an extended communication range for the portable SUs. Preferably, such range extension is automated such that when a portable SU is within communication range of a MRS this range extension takes place and the portable SU is able to communicate a greater distance. By deploying an MRS, the SUs can be distributed over a wide geographical area.

In one deployment approach, a MRS can be a fixed unit that is deployed at a particular location to extend coverage in a fixed area. In another deployment approach, a MRS can be implemented within a transportable unit (e.g., suitcase) that can be transported by a user. In a more common arrangement, a MRS can be installed or mounted in a vehicle that can be deployed to different regions, and can provide repeater capability between portable SUs and a base station. In any of these deployments, the MRS is powered by a power system in which battery life is generally not a concern (in comparison to batteries used with portable SUs), and can transmit at a higher power level. The MRS can also include a relatively larger antenna (in comparison to those used with portable SUs) that improves transmission and reception efficiency. In some implementations, the MRS may also include multiple antennas (e.g., diversity antenna structures) that increase transmission and reception reliability.

SUs within proximity of the vehicle having the MRS can communicate amongst one another on a single channel provided by the MRS. To explain further, an MRS typically consists of a mobile trunked interface (MTI) that is physically connected to a repeater interface (RI). The MTI provides the radio communication to fixed network equipment (FNE) on the fixed system, and the RI interfaces to the SU on a conventional channel for providing talk groups. Multiple SUs can use a single MRS for creating a talk group at any time if the SUs are all on the same channel. However, the MRS can provide only one physical channel of communication at a time, and therefore can only support one talk group at a time. In other words, although the MRS can support more than one talk group, because there is only one channel available, only one active talk group conversation can be supported at one time. The other talk groups have to wait until the channel is freed.

SUs can operate in various modes. For instance, SUs can communicate directly with each other in a "talk around" mode without any intervening equipment between two SUs, or in a conventional mode where a requesting SU chooses the channel to talk on and two SUs communicate through a repeater or base station without trunking. In addition, some modern systems use a trunking protocol that allows multiple users and groups to share one or more frequency channel pairs (e.g., a pool of channels). In a trunked system, a repeater or base station can provide a control channel that individual SUs monitor and use to request a frequency channel to transmit on. Two radios may communicate in a trunked mode where infrastructure equipment dynamically assigns the requesting SU a channel to talk on and traffic is automatically assigned to one or more voice/traffic channels by the repeater or base station. This protocol allows multiple talk groups to share a group of frequencies without interfering with one another. In this regard, it is noted that in a conventional system, the talk groups that share a channel must wait for the channel to be idle before starting a conversation, and even if there is another "open" MRS present at the site, there is no way to inform the SUs (that belong to a particular talk group) that they should use a channel provided by the open MRS.

Multiple MRSs

In many cases, multiple MRSs can be deployed at the same site or incident scene. Each of the MRSs are configured to operate as a single frequency repeater. Because each MRS is only capable of providing one physical communication channel, the multiple MRSs can only support one talk group at a time. In other words, since there is only one physical channel on a MRS, only one of the talk groups can use that channel at any particular time.

In situations where multiple MRSs are deployed to a site in proximity to each other, the multiple MRSs may interfere with each other if they operate at the same time. To avoid such interference, it is common for one MRS to be designated as a master that remains active, and for the other MRSs to be designated as slaves that simply repeat radio communication for the master. One approach for doing so is disclosed in U.S. Pat. No. 7,711,319, entitled "Method and System for Distributing Talk Group Activity Among Multiple Vehicle Repeaters," assigned to the assignee of the present disclosure, its contents being incorporated herein by reference in its entirety.

However, with this approach, some of the communication resources of the slave MRSs are not utilized. In addition, his approach does nothing to eliminate contention between two talk groups assigned to one MRS.

Notwithstanding these advances, there is a need for improved methods, systems and apparatus for utilizing multiple MRSs when they are deployed at a same site.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

FIG. 6E is a table that provides further details regarding Guaranteed Bit Rate (GBR) and non-GBR bearers that are employed in accordance with one or more of the disclosed embodiments.

Figure 1:
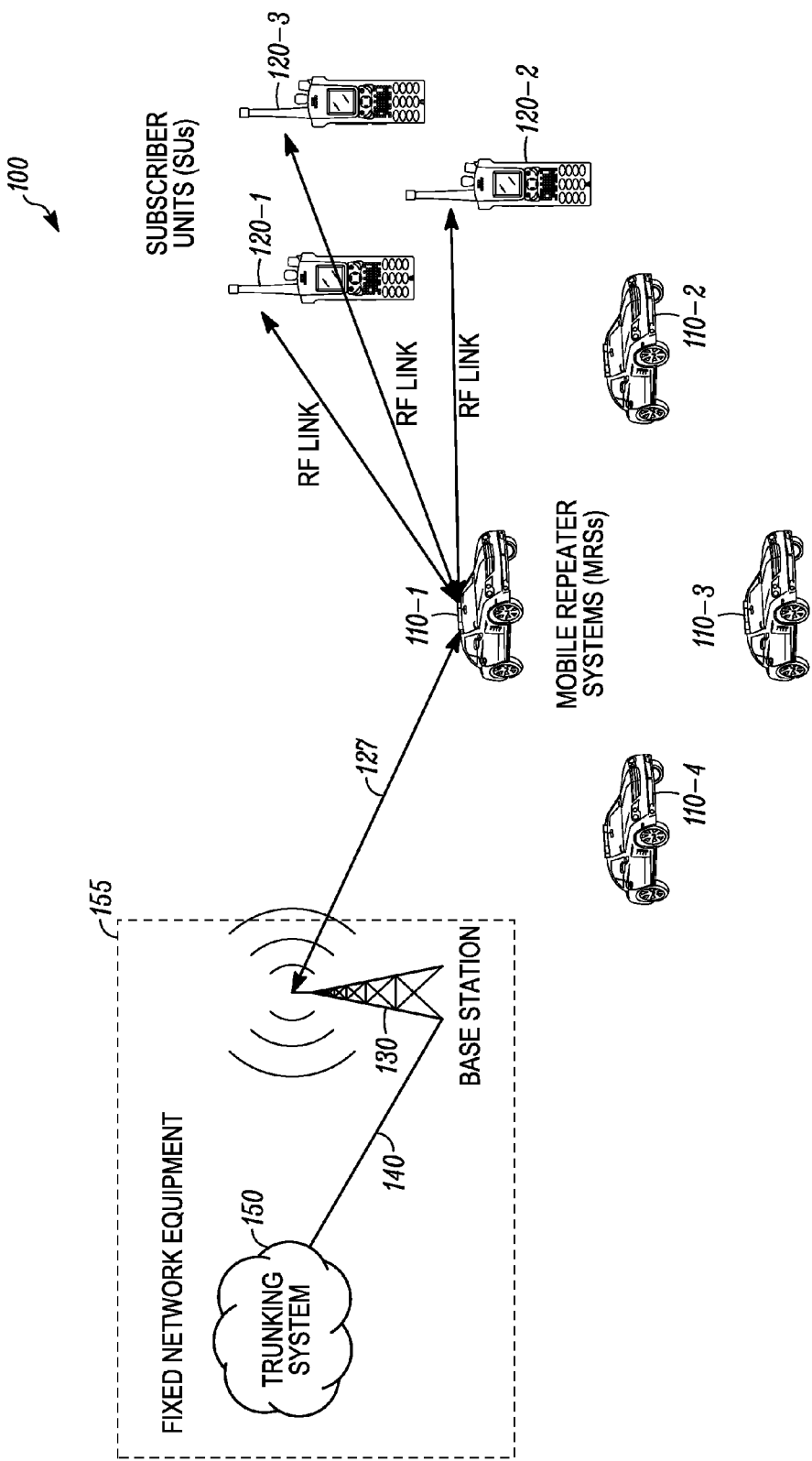
FIG. 1 is a diagram of a conventional trunked communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In accordance with some of the disclosed embodiments, a first Mobile Repeater System (MRS), that is configured to serve as an access point associated with a Basic Service Set (BSS), broadcasts a Basic Service Set Identifier (BSSID). Other Mobile Repeater Systems (MRSs) join the BSS to create a local ad hoc trunked site in which each of the MRSs are communicatively coupled via at least one WLAN communication link. These MRSs include the first MRS and a second MRS. The first MRS can be configured to provide a control channel for communication with a first subscriber unit (SU), and the second MRS can be configured to provide a first trunked traffic channel for communication with the first SU. In some implementations, other MRSs can be configured to provide other trunked traffic channels for communication with the first SU and/or other SUs located within communication range of the local ad hoc trunked site.

Prior to describing these embodiments, certain features of a conventional trunked communication network will now be described with reference to FIG. 1.

FIG. 1 is a diagram of a conventional trunked communication network 100.

The conventional trunked communication network 100 includes a plurality of Mobile Repeater Systems (MRSs) 110, a plurality of SUs 120, and a trunked site 155.

The network 100 illustrated in FIG. 1 is a simplified representation of one particular network configuration, and many other network configurations are possible. Although not illustrated in FIG. 1, it will be appreciated by those skilled in the art that the network can include additional base stations (BSs), additional MRSs and/or additional SUs that are not illustrated for the sake of convenience. In this particular non-limiting example, as well as in the other examples that will be described below, the MRSs 110 include a first MRS 110-1, a second MRS 110-2, a third MRS 110-3, and a fourth MRS 110-4, and the plurality of SUs 120 include a first SU 120-1, a second SU 120-2, and a third SU 120-3. However, it will be appreciated that in a practical deployment scenario, any number of MRSs and SUs could be present. In some implementations, each of the SUs 120 can be part of a common talk group, and in some cases each of the SUs 120 can be part of one or more additional communication groups.

Examples of such networks 100 include two-way radio communication systems that are described in a number of standards that relate to digital two-way radio systems. Examples of such standards include, the Terrestrial Trunked Radio (TETRA) Standard of the European Telecommunications Standards Institute (ETSI), Project 25 of the Telecommunications Industry Association (TIA) and ETSI's digital mobile radio (DMR) Tier-2 Standard, which are incorporated by reference herein in their entirety. The TETRA standard is a digital standard used to support multiple communication groups on multiple frequencies, including one-to-one, one-to-many and many-to-many calls. The TETRA standards and DMR standards have been and are currently being developed by the European Telecommunications Standards Institute (ETSI). The ETSI DMR Tier-2 standard is yet another digital radio standard that describes such two-way peer-to-peer communication system. Any of the TETRA standards or specifications or DMR standards or specifications referred to herein may be obtained by contacting ETSI at ETSI Secretariat, 650, route des Lucioles, 06921 Sophia-Antipolis Cedex, FRANCE. Project 25 defines similar capabilities, and is typically referred to as Project 25 Phase I and Phase II. Project 25 (P25) or APCO-25 refer to a suite of standards for digital radio communications for use by federal, state/province and local public safety agencies in North America to enable them to communicate with other agencies and mutual aid response teams in emergencies. The P25 specifies standards for the manufacturing of interoperable digital two-way wireless communications products. Developed in North America under state, local and federal representatives and Telecommunications Industry Association (TIA) governance, P25 is gaining worldwide acceptance for public safety, security, public service, and commercial applications. The published P25 standards suite is administered by the Telecommunications Industry Association (TIA Mobile and Personal Private Radio Standards Committee TR-8). Any of the P25 standards or specifications referred to herein may be obtained at TIA, 2500 Wilson Boulevard, Suite 300, Arlington, Va. 22201.

As used herein, the term "mobile repeater system (MRS)" refers to equipment that is configured to wirelessly communicate signals between a BS and SUs. A MRS may be mobile, such as being mounted in a vehicle, or fixed, such as being mounted in a building or tunnel having a gap in local coverage, or located at the edge of an existing coverage area. In one implementation, the MRSs 110 can be located in or implemented in a vehicle that can be located, for example, at an incident scene. The MRSs 110 can be implemented using, or in conjunction with, any type of communication device capable of operating in a wired or wireless environment. A MRS 110 can provide talk group support to a plurality of SUs 120 in an area of the MRS 110. More than one SU is generally present in a talk group for supporting group call or dispatch communication.

As used herein, the term "subscriber unit (SU)" can refer, for example, to a portable/mobile radio, a personal digital assistant, a cellular telephone, a video terminal, a portable/mobile computer with a wireless modem, or any other wireless communication device that is operable in a trunked network, such as those described by the P25 standards. For purposes of the following discussions, the communication devices will be referred to as "subscriber units (SUs)," but they are also referred to in the art as wireless communication devices, mobile stations, mobile equipment, handsets, mobile subscribers, or an equivalent. In general, the SUs 120 are two-way radios capable of operating on one or more radio frequency communication channels. Each SU can include a transmitter and a receiver (or a transceiver) for wireless communication over radio frequency (RF) links 123.

In FIG. 1, the SUs 120 are within communication range of the MRSs 110, and because they are portable they can move freely within a vicinity of the extended coverage area provided by the corresponding MRSs 110 (e.g., a region in which the MRS can successfully transmit and receive radio communication signals).

The SUs 120 can communicate directly with each other (e.g., without any intervening equipment involved in the communications between the two SUs) when operating in a "talk around" mode. In a conventional mode, two or more SUs 120 can communicate through a MRS 110 without trunking. By contrast, when trunking is implemented, the SUs 120 continue to operate in a conventional mode with respect to their communications with a MRS 110, and a trunked mobile interface of the MRS 110 will communicate with the trunked site 155.

The SUs 120 can operate in a single frequency band, or alternatively may operate in a plurality of frequency bands. The SUs 120 can communicate with a corresponding MRS over one frequency pair within a frequency band of the RF link. For example, the SUs 120 may be configured to support analog or digital communications in at least the following bands: 30-50 MHz Very High Frequency (VHF) Low (LO) band; 136-174 MHz VHF High (Hi) band; 380-520 MHz Ultra High Frequency (UHF) band; and 762-870 MHz band. The disclosed embodiments are not however limited to these radio frequency bands and the SUs can operate in other frequency bands.

The fixed network equipment (FNE) 155 includes a BS 130 and trunking system 150 that is coupled to the BS 130 via communication link 140.

In operation, the portable SU 120 can transmit communication signals that are received by one of the MRSs 110, and retransmitted to the BS 130 via RF link 127.

In one implementation, the BS 130, the MRS 110 and SUs 120 may be configured to communicate in an analog and/or digital mode.

In one implementation of the network 100, the BS 130 and MRSs 110 can communicate with one another using an inbound 25 kilo Hertz (kHz) frequency band or channel and an outbound 25 kHz frequency band or channel. In other implementations, inbound and outbound channels having different bandwidths (e.g., 12.5 kHz, 6.25 kHz, etc) can be implemented.

Those skilled in the art will appreciate that the BS 130 and MRSs 110 may communicate with one another using a variety of air interface protocols or channel access schemes. For example, it may be desirable to improve or increase "spectral efficiency" of such systems so that more end-users can communicate more information in a given slice of RF spectrum. Thus, in some two-way digital radio systems, a particular channel, such as the 25 kHz channel described above, that historically carried a single call at a given time can be divided to allow for a single channel to carry two (or more) calls at the same time.

FDMA splits the channel frequency into two smaller sub-channels that can carry separate calls side-by-side. For example, Project 25 Phase I uses 12.5 kHz channels and currently uses FDMA for both trunked and conventional digital systems. In such implementations, a single 25 kHz channel can be divided into a 12.5 kHz outbound sub-channel for use by the BS when communicating to one of its registered SUs and a 12.5 kHz inbound sub-channel for use by one of the registered SUs when communicating with its BS. In still other implementations, the inbound 12.5 kHz sub-channel can be further divided into two 6.25 kHz sub-sub-channels to allow two SUs to communicate with their BS at any given time using different 6.25 kHz frequency segments of the inbound sub-channel, and the outbound 12.5 kHz sub-channel can also be divided into two 6.25 kHz sub-sub-channels for communications from the BS to the two SUs In another implementation, the 25 kHz inbound and outbound sub-channels can be further divided using either Time-Division Multiple Access (TDMA) Orthogonal Frequency-Division Multiple Access (OFDMA) multiple access technologies to increase the number of MRSs that can simultaneously utilize those sub-channels. As will be described below, the disclosed embodiments can apply to any wireless communication system that implements a multiple access scheme that employs a frame structure which includes two or more timeslots, including narrowband digital two-way radio wireless communication systems as described below.

For example, TDMA preserves the full channel width, but divides a channel into alternating time slots that can each carry an individual call. Examples of radio systems that utilize TDMA include those specified in the Terrestrial Trunked Radio (TETRA) Standard, the Telecommunications Industry Association (TIA) Project Phase II 25 Standard, and the European Telecommunications Standards Institute's (ETSI) Digital Mobile Radio (DMR) standard. Project 25 Phase II and the ETSI DMR Tier-2 standard implement two-slot TDMA in 12.5 kHz channels, whereas the TETRA standard that uses four-slot TDMA in 25 kHz channels.

For instance, a 12.5 kHz inbound sub-channel can be further divided into two alternating time slots so that a particular MRS can use the entire 12.5 kHz inbound sub-channel during a first time slot to communicate with the BS, and another MRS can use the entire 12.5 kHz inbound sub-channel during a second time slot to communicate with the BS. Similarly, use of the 12.5 kHz outbound sub-channel can also be divided into two alternating time slots so that the particular BS can use the entire 12.5 kHz outbound sub-channel to communicate with a particular MRS (or communication group of wireless communication devices) during a first time slot, and can use the entire 12.5 kHz outbound sub-channel to communicate with another particular wireless communication device (or another communication group of wireless communication devices) during a second time slot. As one example, Project 25 Phase 2 TDMA uses twelve (12) 30 millisecond time slots in each superframe. Each time slot has a duration of 30 milliseconds and represents 360 bits.

Project 25 Phase 2 TDMA uses two different modulation schemes to modulate data streams for over-the-air transmission in a 12.5 kHz channel. The first scheme, called harmonized continuous phase modulation (H-CPM), may be used by the SUs for uplink inbound transmission. H-CPM is a common constant-envelope modulation technique. The second scheme, called harmonized differential quadrature phase shift keyed modulation (H-DQPSK), may be used at BS 130 for downlink outbound transmissions. H-DQPSK is a non-coherent modulation technique that splits the information stream into two channels, delays one channel by 90° in phase (quadrature) and then recombines the two phase shift keyed channels using differential coding (encoding the difference of the current data word applied to the transmitter with its delayed output). Combining two channels in quadrature (again, 90° out of phase with each other) lowers the transmitted baud rate, improving the transmitted spectral characteristics. H-DQPSK modulation requires linear amplifiers at the BS.

Regardless of the multiple access technique that is implemented, the RF resources available for communicating between a BS and its associated wireless communication devices are limited. One example of an RF resource is a time slot in TDMA-based systems, and another example is a frequency sub-channel within a particular time slot in OFDMA-based systems. At any given time, a single RF resource can be allocated to either a communication group (e.g., one WCD communicating with two or more other WCDs) or a communication pair (e.g., two WCDs communicating only with each other).

Figure 2:
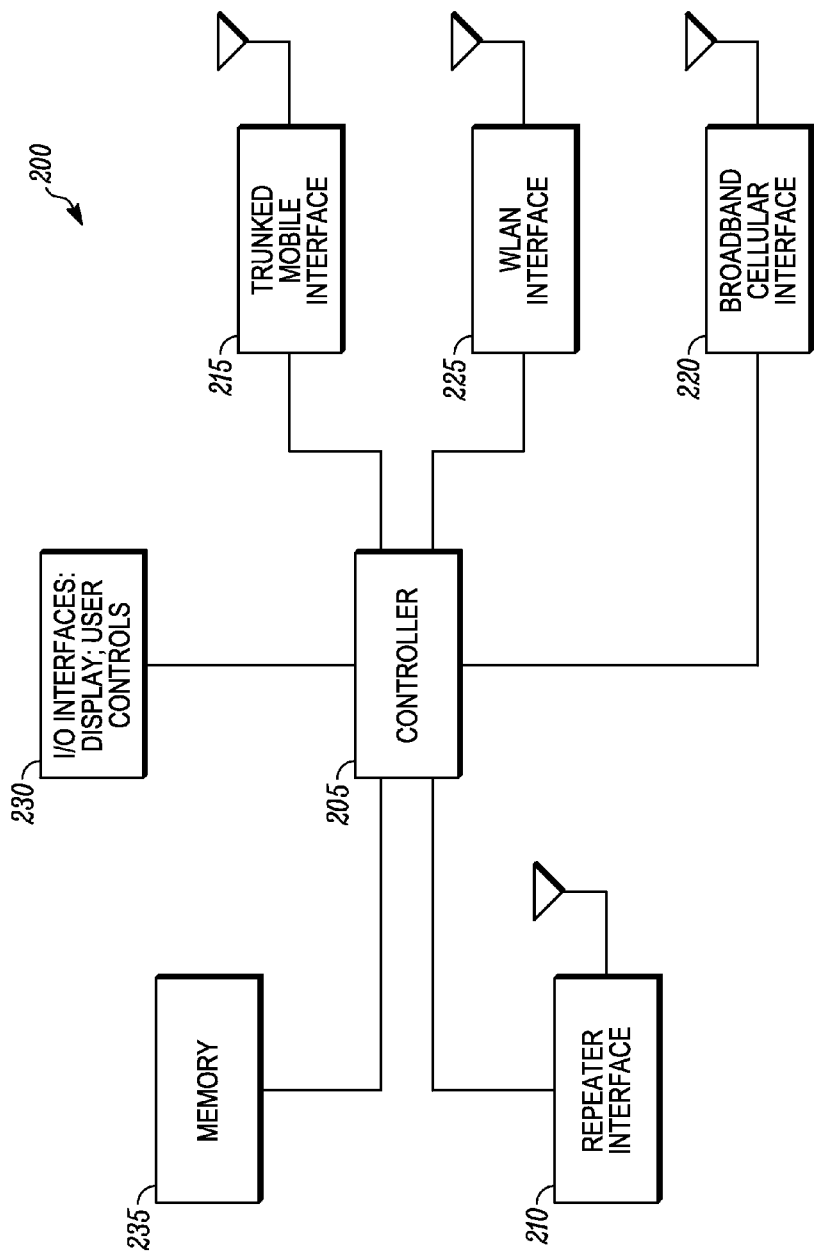
FIG. 2 is a block diagram of a Mobile Repeater System (MRS) in accordance with some embodiments.

FIG. 2 is a block diagram of a Mobile Repeater System (MRS) 110 in accordance with some embodiments. The MRS 110 is typically deployed as an integrated unit containing at least all the elements depicted in FIG. 2, as well as any other elements necessary for the MRS 110 to perform its particular functions. Alternatively, the MRS 110 may comprise a collection of appropriately interconnected units or devices, wherein such units or devices perform functions that are equivalent to the functions performed by the elements of the MRS 110. The MRS 110 includes a controller 205, a repeater interface 210 for communicating with SUs, a mobile trunked interface 215 for communication with a BS 130, a cellular interface 220 for communication with a cellular BS, a WLAN interface 225 for communication with other MRSs, input/output interfaces 230, and a memory 235. As illustrated in FIG. 2, the MRS 110 includes wireless communication interfaces 210, 215, 220, 225.

Each of the wireless communication interfaces 210, 215, 220, 225 can include at least one controller/processor for performing at least some of the functionality described below to carry out communications with other entities in the network, at least one transceiver including transmitter circuitry and receiver circuitry, an antenna, a program memory for storing operating instructions that are executed by the controller, as well as other components that are used to implement a communication interface as will be understood by those skilled in the art. In this regard, the wireless communication interfaces 210, 215, 220, 225 can each have their own transceiver that includes transmitter circuitry and receiver circuitry to communicate information packets to and acquire information packets from the other nodes or network entities within the communication network. In other embodiments, portions of the transmitter circuitry and receiver circuitry may be shared amongst the wireless communication interfaces. The transmitter circuitry and the receiver circuitry include circuitry to enable digital or analog transmissions over a communication channel.

The implementations of the transmitter circuitry and the receiver circuitry depend on the implementation of the MRS 110. For example, the transmitter circuitry and the receiver circuitry can be implemented as an appropriate modem, or as conventional transmitting and receiving components of communication devices. The modem can be internal to the MRS 110 or insertable into the MRS 110 (e.g., embodied in a wireless a radio frequency (RF) modem implemented on a Personal Computer Memory Card International Association (PCMCIA) card). The transmitter circuitry and the receiver circuitry are preferably implemented as part of the wireless device hardware and software architecture in accordance with known techniques. In some implementations, most, if not all, of the functions of the transmitter circuitry and/or the receiver circuitry, as well as the communication interfaces can be implemented in a controller, such as the controller 205. However, the controller 205, the transmitter circuitry, the receiver circuitry, and the communication interfaces have been artificially partitioned herein to facilitate a better understanding.

In some implementations, the receiver circuitry is capable of receiving RF signals from at least one frequency bandwidth and optionally more than one frequency bandwidth, if the communications with the proximate device are in a frequency band other than that of the network communications. The transceiver includes at least one set of transmitter circuitry. The at least one transmitter may be capable of transmitting to multiple devices over multiple frequency bands. As with the receiver, multiple transmitters may optionally be employed. In one implementation, one transmitter can be used for the transmission to a proximate node or direct link establishment to WLAN(s), and other transmitters can be used for transmission to a cellular BS(s). Any one of the antennas can include any known or developed structure for radiating and receiving electromagnetic energy in the frequency range containing the wireless communication frequencies.

The controller 205 can include one or more microprocessors, microcontrollers, DSPs (digital signal controllers), state machines, logic circuitry, application-specific integrated circuits (ASICs) and programmable devices, such as a field programmable gate arrays (FPGAs) or complex programmable logic devices (CPLDs), or any other device or devices that process information based on operational or programming instructions.

Such operational or programming instructions are preferably stored in the program memory 235. The memory 235 can include a computer-readable storage medium on which is stored one or more sets of instructions (e.g., software code) configured to implement one or more of the methodologies, procedures, or functions described herein. The program memory 235 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the controller 205 has one or more of its functions performed by a state machine or logic circuitry, the memory 235 containing the corresponding operational instructions may be embedded within the state machine or logic circuitry. The operations performed by the controller 205 and the rest of the MRS 110 are described in detail below. Within the memory 235, a buffer memory can be provided that can be any form of volatile memory, such as RAM, and may be used for temporarily storing received information packets.

Each of the wireless communication interfaces 210, 215, 220, 225 can include at least one radio that includes an antenna, a transceiver, and a controller/processor, which are not illustrated for sake of brevity. The communication interfaces 210, 215, 220, 225 can each operate over a different protocol or radio protocol in a different frequency bandwidth. The communication interfaces 210, 215, 220, 225 may each have their own transceiver, but for sake of simplicity the transceivers for all of the communication interfaces 210, 215, 220, 225 are not shown in FIG. 2. Each of these communication interfaces 210, 215, 220, 225 can support certain bandwidth requirements, communication range requirements, etc. Each communication interface 210, 215, 220, 225 operates at a data rate (or one of a set of data rates), and operates in a frequency band (or one of a set of frequency bands) having a bandwidth. The communication interfaces generate a modulated data stream, and can demodulate data using at least one demodulation technique to generate a demodulated data stream. It will be appreciated that the communication interfaces 210, 215, 220, 225 are exemplary. Moreover, while the exemplary MRS 110 shows four communication interfaces 210, 215, 220, 225, it will be appreciated that in other practical implementations nodes could include only some of these communication interfaces or additional communication interfaces that are not shown.

The repeater interface 210 includes a receiver, a transmitter, and a controller. The repeater interface 210 is used for communication between the MRS and SUs. The receiver operates under control of the controller to receive signals for retransmission (from portable SUs) via an antenna. The transmitter operates in conjunction with the controller to transmit signals intended for the portable SUs via the antenna. The mobile trunked interface 215 is used for communication between the MRS and a BS 130. The repeater interface 210 interfaces with the mobile trunked interface 215 to support its retransmission functions. Thus, the receiver of the repeater interface 210 is coupled to transmitter of the mobile trunked interface 215, and the transmitter of the repeater interface 210 is coupled to a receiver of the mobile trunked interface 215. The transmitter and the receiver of the mobile trunked interface 215 are coupled to a mobile antenna. The mobile trunked interface 215 has a controller that controls the operation of its transmitter and receiver. Communication between the controller for the repeater interface 210 and the controller for the mobile trunked interface 215 facilitates operation of the MRS 120. The MRS 120 typically monitors the receiver of the mobile trunked interface 215 to detect the retransmission of a voice communication signal which is submitted to the MRS for retransmission.

The cellular interface 220 is used for communication between the MRS and a cellular BS (as will be explained below). The cellular interface 220 can utilize any one of a number of different multiple access techniques such as Frequency Division Multiplexing (FDM), Time Division Multiplexing (TDM), Code Division Multiplexing (CDM), and others. Examples of multiple access schemes which can be used in the network can include any one or more of time division multiple access (TDMA), direct sequence or frequency hopping code division multiple access (CDMA), Global System for Mobile communication (GSM), Wide-band CDMA (WCDMA), Universal Mobile Telecommunications System (UMTS), frequency division multiple access (FDMA), orthogonal frequency division multiplexing (OFDM), opportunity division multiple access (ODMA), a combination of any of the foregoing multiple access technologies, a multiple access technology in which portions of the frequency spectrum to be used are determined by local signal quality measurements and in which multiple portions of the frequency spectrum may be used simultaneously, or any other multiple access or multiplexing methodology or combination thereof. Moreover, the cellular interface 220 can support communication in compliance with at least the following communication standards: (1) standards governed by a consortium named "3rd Generation Partnership Project" (3GPP), (2) standards governed by a consortium named "3rd Generation Partnership Project 3" (3GPP2), (3) the high data rate (HDR) system that conforms to the TIA/EIA/IS-856 standard (the IS-856 standard), and (4) other standards.

The WLAN interface 225 is used for communication between the MRS and other MRSs. The WLAN interface 225 can be, for example, an ad hoc networking air interface, and in this exemplary embodiment is an IEEE 802.11 WLAN communication interface which complies with any of the IEEE 802.11 Standards and specifications (e.g., IEEE 802.11(a), (b), (g) or (n)). The WLAN communication interface 225 can also be any communication interface which complies with any of the other IEEE 802.11 Standards, any of the IEEE 802.16 Standards, or another wireless standard. For example, WLAN communication interface 225 can be a communication interface which complies with the IEEE 802.16e WiMax specifications. In some implementations, the cellular interface 220 can be, for example, an ultrawide band (UWB) communication interface which implements a Multiple Input Multiple Output (MIMO) communication interface which operates using Orthogonal Frequency Division Multiplexing (OFDM) modulation techniques or other modulation techniques. Alternatively, it will be appreciated that the WLAN communication interface 225 can be a communication interface which complies with the IEEE 802.20 Mobile Broadband Wireless Access (MBWA) specifications for IP-based services. The MRS can also include external input/output interfaces (not illustrated) that include ports for USB, serial, Ethernet, and Firewire, among others.

The input/output interfaces 230 can include user controls such as buttons, switches and/or knobs that a user can use to interact with the controller 205, a keyboard, which can be used to enter text data to be stored or transmitted, a user display (e.g., an LCD display, LEDs, and other indication devices), and multiple speakers and/or microphones.

Figure 3:
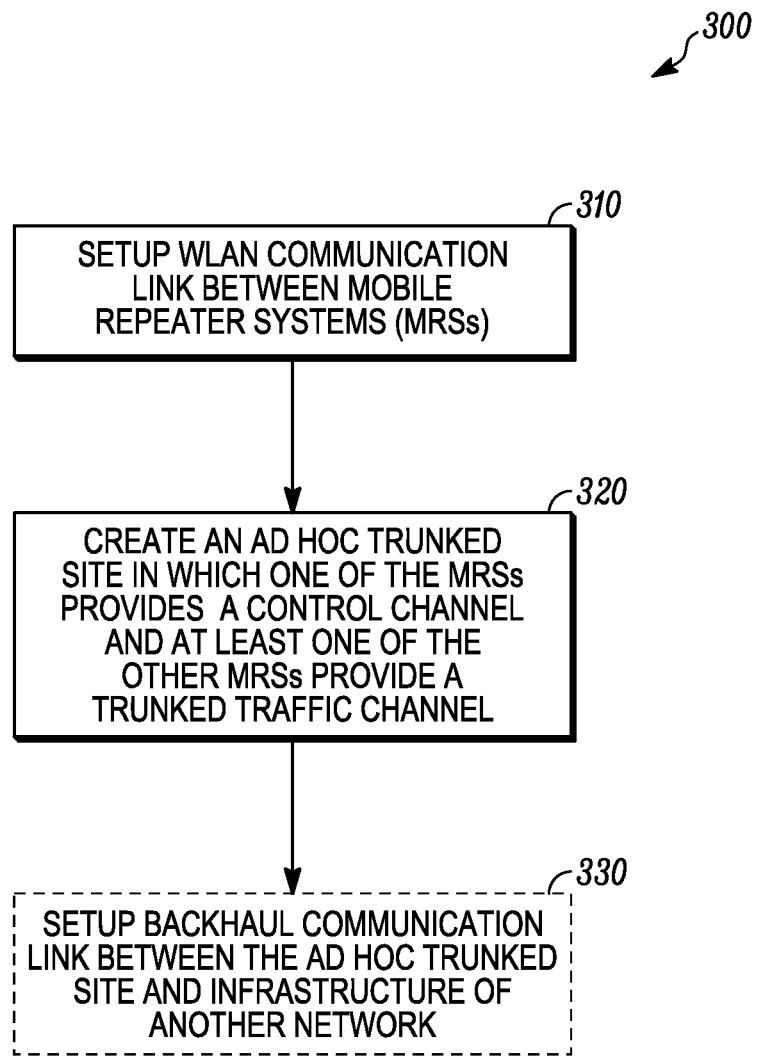
FIG. 3 is a flowchart of a method in accordance with some embodiments.

FIG. 3 is a flowchart of a method 300 in accordance with some embodiments. The method 300 can be used to extend the capability of mobile repeater systems (MRSs) so that multiple MRSs can self-organize into an ad hoc trunked site using WLAN communication links. Once organized, the MRSs can operate together as an ad hoc trunked site in which each MRS provides either a control channel or a traffic channel for communication with SUs and other infrastructure. This can prevent multiple MRSs that are deployed within range of each other (e.g., at an incident scene) from interfering with each other. When multiple traffic channels are implemented, multiple talk groups can communicate simultaneously. This adds capacity and coverage by bringing trunking functionality to a location where the ad hoc trunked site is set up.

The method 300 begins at 310, where WLAN communication links are setup between the MRSs 110 (of FIG. 1) to create an ad hoc trunked site. At 320, the WLAN communication links are used to create a mesh network between the MRSs 110. One the mesh network is created, an ad hoc trunked site 115 (see FIG. 4A) can be established by assigning one of the MRSs 110-1 to provide a control channel, and by assigning at least one of the other MRSs 110-2 . . . 110-4 to provide a trunked traffic channel.

In some embodiments, a backhaul communication link (also referred to herein as a "system network connection") can also be established that allows the SUs to stay connected to a larger network. Block 330 is illustrated in a dashed-line box in FIG. 3 since it is optional. At 330, a backhaul communication link can be set up between the ad hoc trunked site 115 and infrastructure of another network. For example, as will be described in greater detail below with reference to FIGS. 5A-5D, in one implementation, the backhaul communication link can be set up between the ad hoc trunked site 115 and a BS 130 (of FIG. 1) that directly communicates with the trunking system 150 (e.g., of a APCO 25 network). In another implementation, as will be described in greater detail below with reference to FIGS. 6A-6D, the backhaul communication link can be set up between the ad hoc trunked site 115 and a cellular BS 160 that indirectly communicates with the trunking system 150 of fixed network equipment 155 (e.g., of a APCO 25 network) over a core network 180. In one exemplary implementation, the cellular BS and the core network can be compliant with wireless communication standards (e.g., UMTS and the Long Term Evolution (LTE) wireless communication standards.)

Figure 4A:
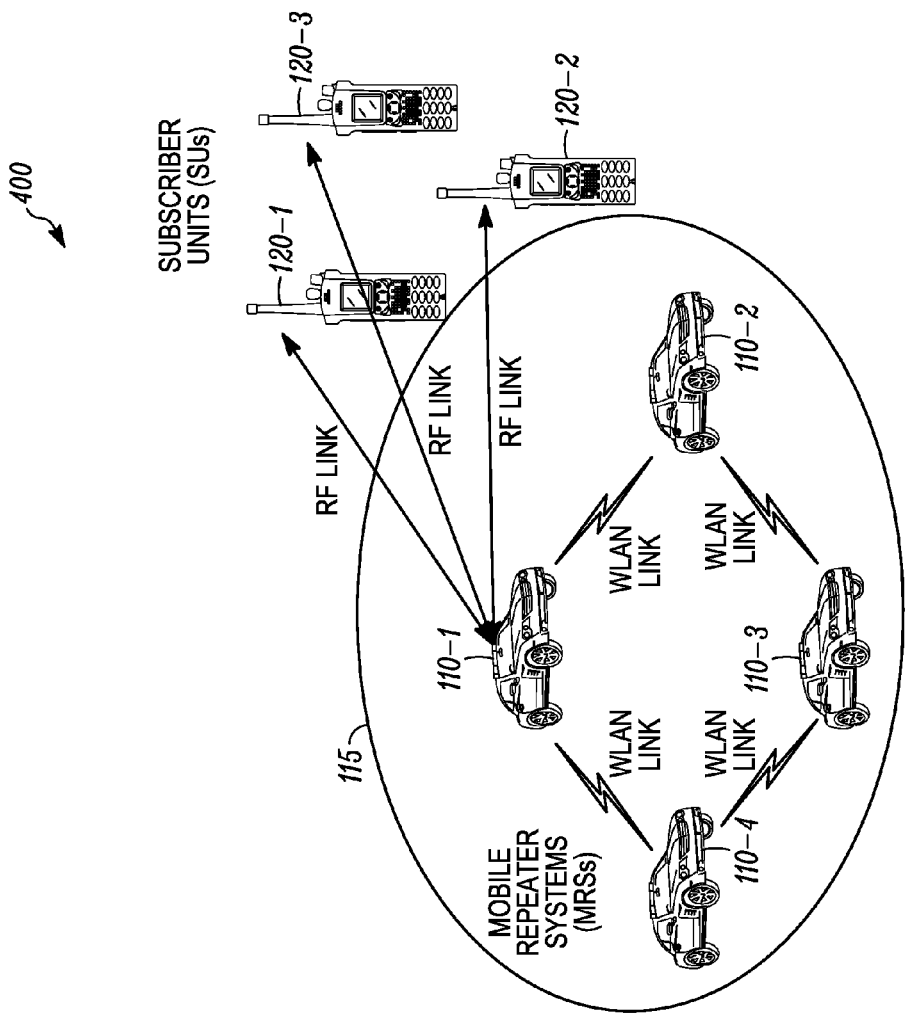
FIGS. 4A-4C are a series of diagrams of a trunked communication network that implements Mobile Repeater Systems (MRSs) in accordance with some embodiments.
Figure 4B:
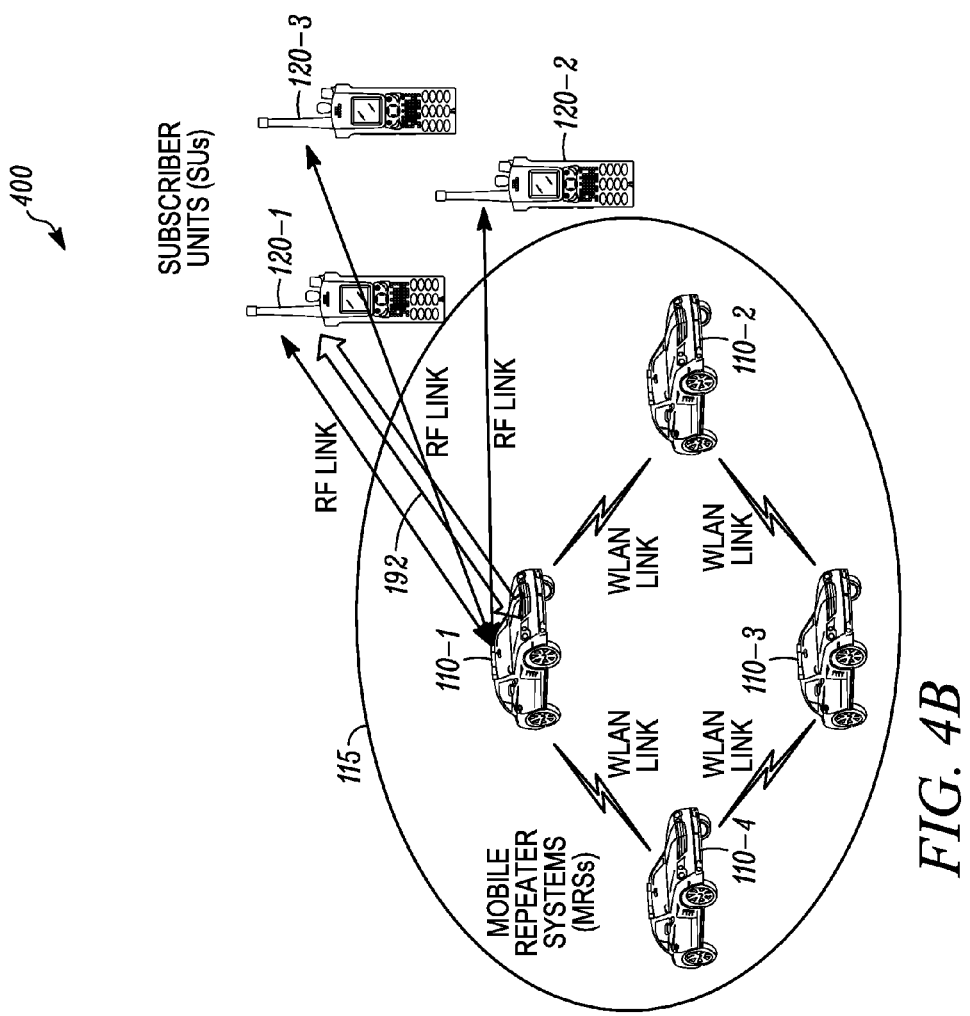
Figure 4C:
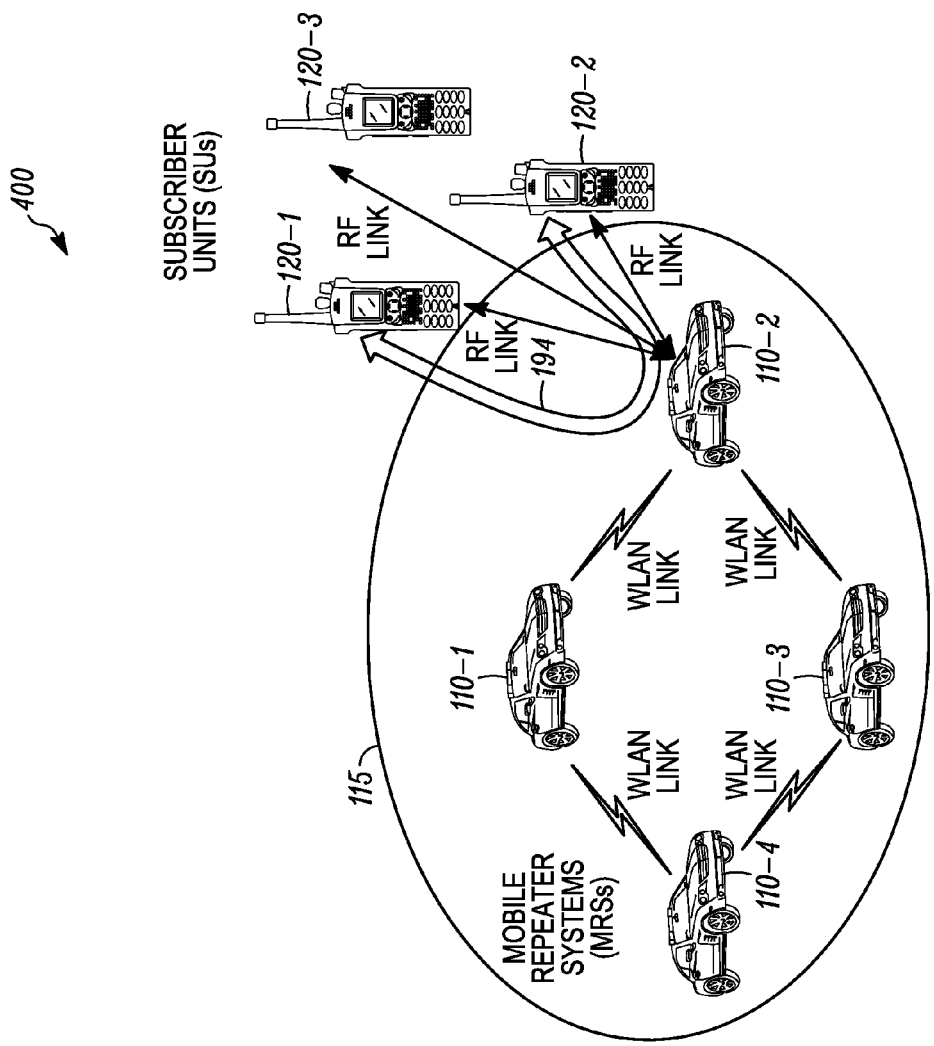

FIGS. 4A-4C are a series of diagrams of a trunked communication network 400 that implements Mobile Repeater Systems (MRSs) 110 in accordance with some embodiments. For sake of brevity, details of FIG. 1 that are also illustrated in FIGS. 4A-4C will not be described again.

In accordance with the disclosed embodiments, each of the MRSs 110 are programmed with a Basic Service Set Identifier (BSSID) (e.g., a predefined MAC address). In one implementation, the BSSID can be pre-programmed into each MRS. In another implementation, the BSSID can be loaded to the MRSs on their way to a scene. In addition, each of the MRSs 110 can also be programmed with a set of frequencies that can be used to implement at least part of the control channel and/or at least part of the traffic channels at the ad hoc trunking site 115. The particular frequencies that are used to implement at least part of the control channel and/or at least part of the traffic channels at the ad hoc trunking site 115 can be determined and assigned by various means. In one embodiment, the particular frequencies can be static or fixed (e.g., predetermined or preconfigured). In another embodiment, the particular frequencies can be dynamically determined (and assigned) based on location of the MRSs. In another embodiment, the particular frequencies can be dynamically determined (and assigned) to avoid interference between the MRSs.

As illustrated in FIG. 4A, the MRSs 110 are configured to self-organize into a local ad hoc trunked site 115 by automatically establishing WLAN communication links among each other.

When each MRS arrives at a particular location, they can automatically enter a trunked site mode that will allow them to either create an ad hoc trunked site 115 or join an ad hoc trunked site 115. The role that a particular MRS will take depends on whether or not other MRSs have already previously arrived and entered trunked site mode.

For example, when a particular MRS arrives at a location, it will attempt to detect a signal that has a predetermined BSSID (or set of BSSIDs). If one of the BSSID(s) is detected, then the particular MRS will join that BSSID as a client of the MRS that is serving as a WLAN AP and take the role of a traffic channel repeater. The MRS can attach itself to the MRS that is advertising the BSSID using predetermined security credentials (e.g., WEP with a passphrase) that are shared between each of the MRSs. By contrast, when the particular MRS arrives at the location and cannot detect a signal having the predetermined BSSID(s), the particular MRS will assume the role of WLAN AP and begin broadcasting a valid BSSID to other MRSs (that respond) to establish a Basic Service Set (BSS).

Thus, when a particular MRS arrives at a location and there is no indication that another MRS has established itself as a first MRS (or control MRS) for the ad hoc trunked site 115 (e.g., that no other MRSs have arrived and entered trunked site mode), then that particular MRS will begin broadcasting a BSSID and wait for other MRSs to respond to start creating the ad hoc trunked site 115. By contrast, when a particular MRS arrives at a location and there is an indication that another MRS has already established itself as a control MRS of an ad hoc trunked site 115 (e.g., the particular MRS receives a signal from another MRS that includes the BSSID for joining the BSS), then that particular MRS can respond to the broadcasting MRS (that is broadcasting the BSSID) to indicate that is has received the BSSID, and is joining the BSS and the ad hoc trunked site 115.

To illustrate one implementation, the description that follows will presume that a first MRS 110-1 is the first to arrive at an incident scene. When the first MRS 110-1 arrives, the first MRS 110-1 can enter a trunked site mode state, and when the first MRS 110-1 determines that it is the first MRS to arrive that is broadcasting a valid BSSID, the first MRS 110-1 can then serve as an access point that establishes WLAN communication link with each of the other MRSs to form a Basic Service Set (BSS) that includes all of the MRSs 110 with the first MRS 110-1 acting as the access point. In one particular implementation, when the first MRS 110-1 learns that other MRSs are present at a scene, but are outside the range of the first MRS 110-1, the first MRS 110-1 can attempt to establish a mesh network (e.g., using techniques described in the IEEE 802.11s standard) among all of the MRSs that are located at the incident scene so that the WLAN AP that is implemented at the first MRS 110-1 can communicate with all MRSs at the scene (including those that are outside of the direct coverage area of the AP).

It is noted that the WLAN communication links used to create the local ad hoc trunked site 115 are distinct from the normal repeater-to-repeater communication links that would be provided when multiple repeaters are present at a site, and the first MRS 110-1 is operating as the master repeater in a normal repeater mode. To explain further, in a conventional trunked site with multiple repeaters, the repeaters communicate with each other over a wired Ethernet connection (e.g., in accordance with IEEE 802.3 standards), and a unique messaging scheme with unique audio packets. By contrast, in an ad hoc trunked site 115 that operates in accordance with the disclosed embodiments, the same messaging scheme and audio packets can be used between the MRSs; however, those communications are carried over the WLAN communication links instead of a wired Ethernet connection.

In one embodiment, as illustrated in FIG. 4B, the first MRS 110-1 (or other MRS that is configured to serve as an access point for the BSS) can be configured to provide a control channel 192 for communication with one or more of the SUs 120. The control channel 192 can be used to communicate control signaling information among/between the MRS and the SUs. In one implementation, the control channel 192 is not broadcast until at least one other MRS attaches itself to the first MRS 110-1 as a voice/traffic channel repeater. In another implementation, if voice on command or slotted control channel is implemented, then trunked site operation (and broadcasting of the BSSID via the first MRS 110-1) could start immediately.

When the first MRS 110-1 assumes the role of providing the control channel 192, and communication can be conducted with other MRSs over the WLAN channel(s), the first MRS 110-1 can accept registration requests from SUs and also accept traffic channel requests and perform any other transactions that would be performed over a control channel 192. Traffic channels that the other MRSs 110-2 . . . 110-4 can provide can carry traffic in a manner similar to a normal MRS. The first MRS 110-1 assigns traffic to the other MRSs 110-2 . . . 110-4 that can provide for traffic channels over the WLAN network that is established over the MRSs.

In one embodiment, the client MRSs 110-2 . . . 110-4 have IP addresses assigned by a DHCP server that is implemented at the first MRS 110-1.

As other MRSs arrive and activate into trunked site mode, those MRS's can attach themselves to the first MRS 110-1 that is broadcasting the BSSID using any known protocol including those specified by the IEEE 802.11 and IEEE 802.16 communication standards.

Each time one of the MRSs attaches to the WLAN AP of the first MRS 110-1 as described above, this adds the potential for implementation of an additional traffic channel. In accordance with the disclosed embodiments, when any other MRS subsequently joins the BSS, then that MRS can be assigned and configured to provide a trunked traffic channel for communication with one or more of the SUs 120. When the first MRS 110-1 grants a traffic channel, it will instruct the one of the client MRSs 110-2 . . . 110-4 that is free to accept the assignment, tune its repeater interface to the assigned channel, and provide the traffic channel on the assigned channel.

For example, in one embodiment that is illustrated in FIG. 4C, the second MRS 110-2 can be configured to provide a first trunked traffic channel 194 for communication with one or more of the SUs 120. When the second MRS 110-2 is assigned the role of providing a traffic channel 194 (as illustrated in FIG. 4C), the second MRS 110-2 will go into repeater mode and wait for a communication to or from a particular SU 120 (or subscriber talk group) and the repeater interface will repeat the communication.

In addition, although not illustrated for sake of brevity, the third MRS 110-3 can be configured to provide a second trunked traffic channel for communication with one or more of the SUs 120, and the fourth MRS 110-4 can be configured to provide a third trunked traffic channel for communication with one or more of the SUs 120, etc. Each trunked traffic channel can be used to communicate voice, data, media, etc. between the SUs and the corresponding MRS that provides the traffic channel.

When all of the channels have been assigned and the local ad hoc trunked site 115 has reached capacity, subsequently arriving MRSs would enter a dormant state until another MRS leaves the local ad hoc trunked site 115, an event which can be detected using a polling technique. The maximum number of traffic channels varies depending on the implementation and on a number of frequencies that are available at the local ad hoc trunked site 115. In one exemplary implementation, twenty-eight channels are available. In one implementation, the control channel can be implemented using a first pair of assigned frequencies over a first repeater-to-subscriber RF communication link, and the first trunked traffic channel can be implemented using a second pair of assigned frequencies, that is different than the first pair of assigned frequencies, over a second repeater-to-subscriber RF communication link; the second trunked traffic channel can be implemented using a third pair of assigned frequencies, that is different than the first or second pairs of frequencies, over a third repeater-to-subscriber RF communication link; the third trunked traffic channel can be implemented using a fourth pair of assigned frequencies, that is different than the first, second and third pairs of frequencies, over a fourth repeater-to-subscriber RF communication link, etc. The first, second, third and fourth pairs of frequencies can be in the same frequency band (e.g., all of the trunked frequencies for a particular trunked system are in the same 30-50 MHz Very High Frequency (VHF) Low (LO) band; or in the same 136-174 MHz VHF High (Hi) band; or in the same 380-520 MHz Ultra High Frequency (UHF) band; or in the same 762-870 MHz band). In another alternative implementation, the first, second, third and/or fourth pairs of frequencies can be in different frequency bands.

Because the MRSs are mobile they can actively arrive and leave the coverage area established by the first MRS 110-1 (or other MRS that is serving as the WLAN AP at that particular time).

The first MRS 110-1 maintains a list of MRSs that are attached and the current traffic channel assignments. When a MRS leaves the site 115, the first MRS 110-1 can contact one of the dormant MRSs and assign it to that same traffic channel as the leaving MRS.

A MRS 110 that is assigned a traffic channel can leave the network when it moves out of WLAN coverage (which effectively breaks the RF link between the first MRS 110-1 and the traffic channel MRS). After a timeout period, the first MRS 110-1 will remove the traffic channel MRS from its operational list and add a dormant MRS to the list (if available). When a MRS leaves the network, that MRS can indicate to the user that is out of service and should be switched to the off state. If the MRS is not switched to the off state, the MRS will repeat the access sequence as if the "trunked mode" was turned on again. In other words, when a traffic channel MRS loses contact with the first MRS 110-1, it assumes the first MRS 110-1 has failed, left, or turn off. If this happens the traffic channel MRS will attempt to find another BSSID and/or start broadcasting its own BSSID in an attempt to set up a site.

A MRS 110 that is assigned a traffic channel can also leave the network when the user takes the MRS out of "trunked site" mode. The MRS will gracefully remove itself from the site (via active signaling over the WLAN connection to the first MRS 110-1) thereby allowing the first MRS 110-1 to assign a dormant MRS (if available) a traffic channel.

The first MRS 110-1 (or other MRS that is providing the control channel and serving as the WLAN AP) can leave the network when the first MRS 110-1 moves out of range of the other MRSs. In one implementation, the first MRS 110-1 can monitor its location (using GPS) and determine when it is moving. The first MRS 110-1 can also monitor connections (or WLAN communication links) to all of the other MRSs, and determine which ones are intact. Using this information, the first MRS 110-1 can determine when it has moved out of range of the other MRSs. For example, in one implementation, the first MRS 110-1 can determine that it has moved out of range of the other MRSs when the first MRS 110-1 determines that connections (or WLAN communication links) to all of the other MRSs have been lost. At this point the first MRS 110-1 can turn the control channel off (on its repeater interface), but it can still continue to transmit the BSSID (on its WLAN interface) to attract new MRSs that might be in its coverage area. An indication can be provided to the user of the first MRS 110-1 that connectivity with other MRSs has been lost and thereby give the user an opportunity to turn off "trunked mode."

The first MRS 110-1 can also leave the network when the user turns off "trunked mode." In this case the first MRS 110-1 turns off the control channel and releases any attached traffic channel MRSs. Depending on the scenario, the other MRSs can either establish a new ad hoc trunked site 115, or go into an off state and terminate the ad hoc trunked site 115. In one implementation, the first MRS 110-1 can communicate different messages to the attached traffic channel MRSs instructing them to either establish a new ad hoc trunked site 115, or to go into an off state and terminate the ad hoc trunked site 115. In either scenario, the remaining MRSs in the area can restart search sequences and attempt to create a new ad hoc trunked site 115. The MRS's can use random delays or backoffs to avoid the possibility of multiple MRSs serving as the WLAN AP (and providing the control channel), creating multiple ad hoc trunked sites 115 in the same coverage area.

The ad hoc trunked site 115 is completely "torn down" when all MRSs have switched out of trunked site mode. This can happen when all of the MRSs have been switched off, when all MRSs have turned off trunked site mode, or when the MRS determines that it has been inactive for a time out period (e.g., automatically turn off when a timer that measures the amount of the time the MRS have been inactive expires).

Thus, as described above with reference to FIGS. 4A-4C, when the MRSs 110 are configured in this local trunking configuration, the MRSs 110 are arranged to create the ad hoc trunked site 115, which operates like a fixed trunking site in trunked site mode. It is noted that in an alternative embodiment, when all MRSs 110 that are determined to be in an area are unable to communicate with the first MRS 110-1, a meshed network can be established between the MRSs 110 using technologies that are compliant with an IEEE 802.11s standard, which are incorporated by reference herein in their entirety.

As will now be explained below, once the MRSs 110 are organized into the ad hoc trunked site 115, a system network connection can be established through a trunked mobile interface or broadband cellular interface of the MRS 110-1.

Figure 5A:
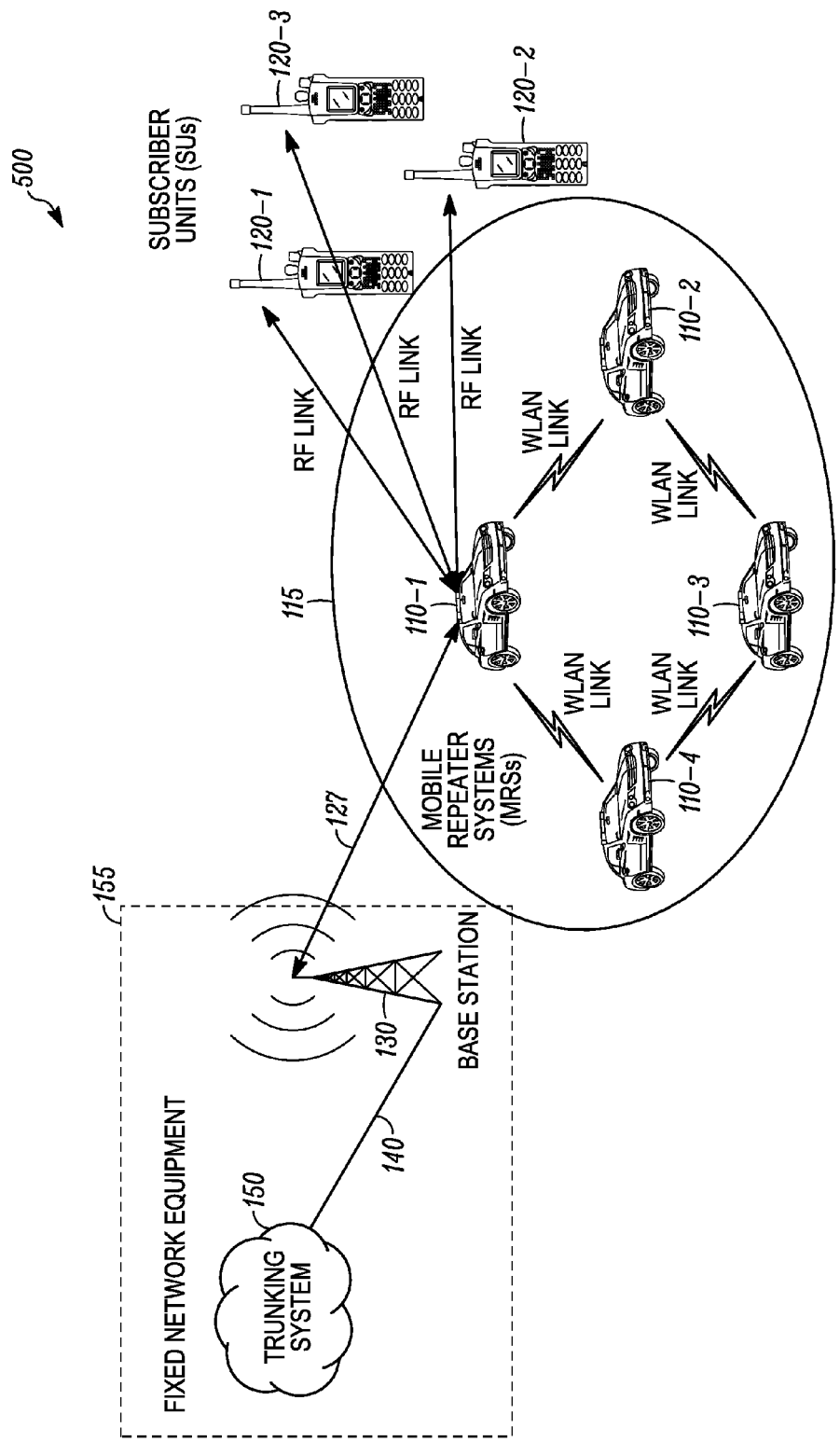
FIGS. 5A-5C are a series of diagrams of a trunked communication network that implements Mobile Repeater Systems (MRSs) in accordance with some other embodiments.
Figure 5B:
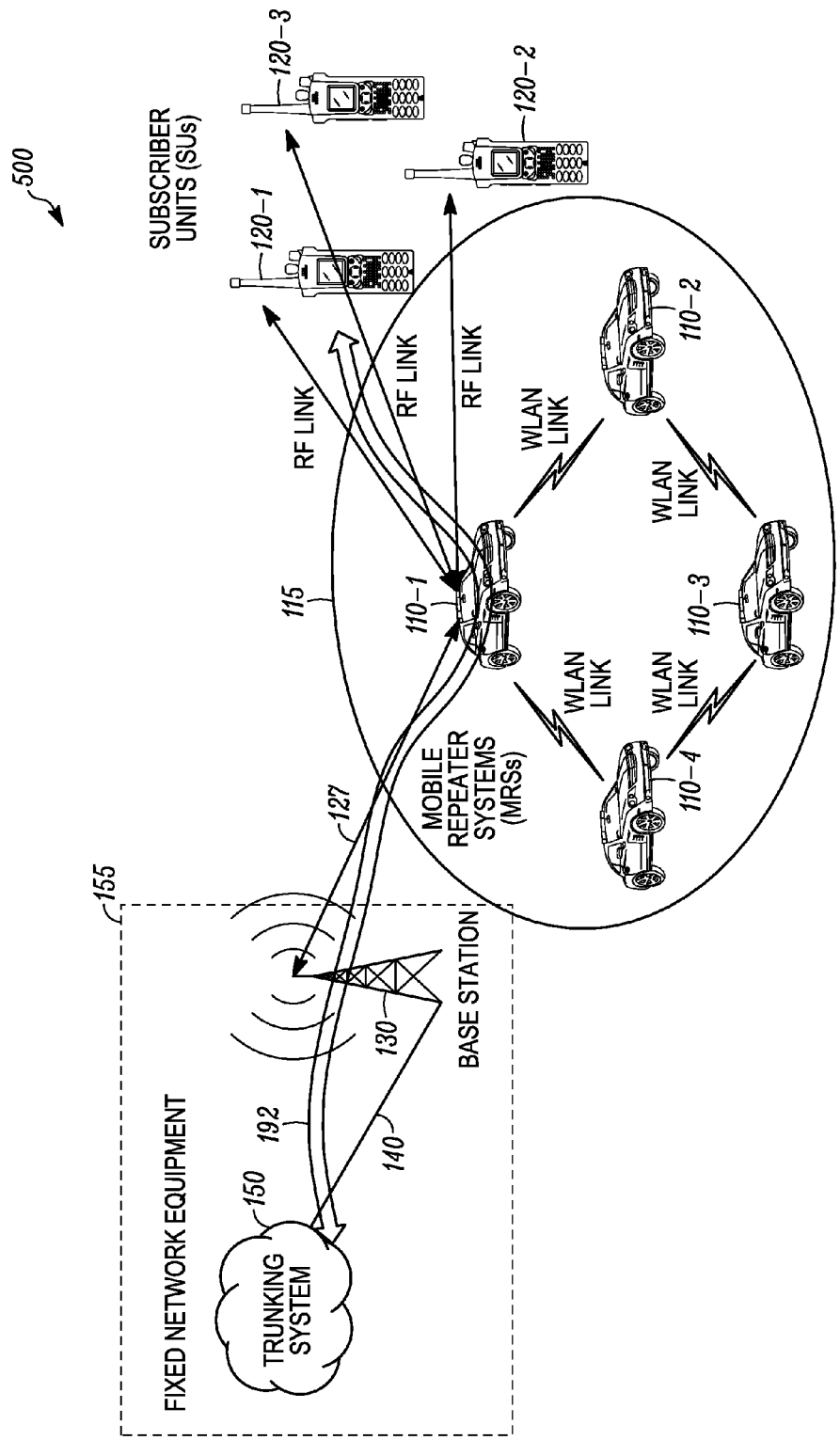
Figure 5C:
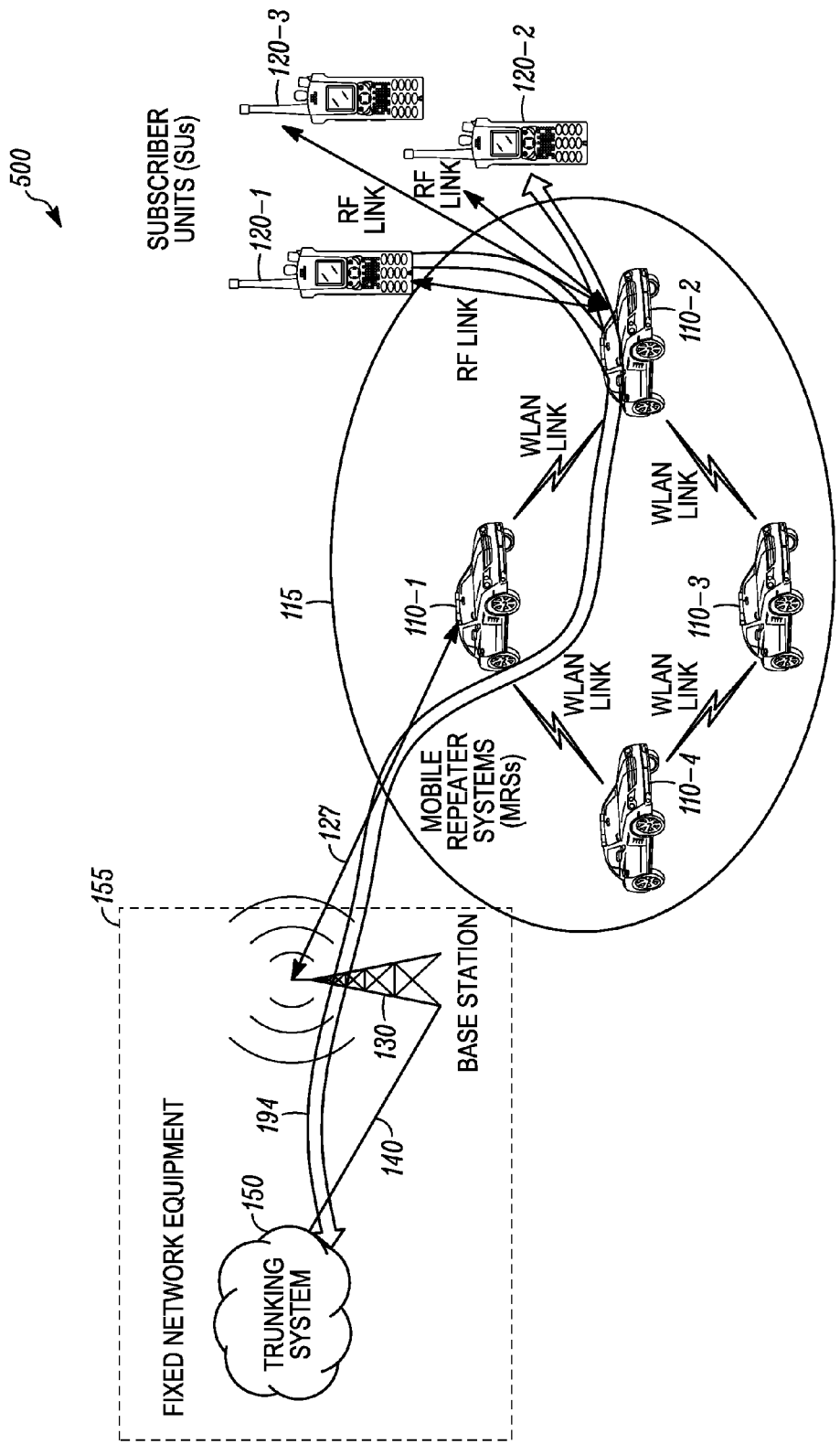

FIGS. 5A-5C are a series of diagrams of a trunked communication network 500 that implements Mobile Repeater Systems (MRSs) 110 in accordance with some embodiments. FIGS. 5A-5C will be described below with reference to FIGS. 1 through 4C, but for sake of brevity, some of the details of FIGS. 1-4C that are incorporated into FIGS. 5A-5C will not be described again. As will be explained below, FIGS. 5A through 5C illustrate a site extension configuration, in which the MRSs 110 are arranged to create the ad hoc trunked site 115, which effectively extends the FNE 155 to the SUs 120 using a separate set of frequencies to implement control and traffic channels.

As illustrated in FIG. 5A, the trunked communication network 500 includes a BS 130.

The MRSs can communicate with the BS 130 over a network-to-repeater RF link 127. In one non-limiting exemplary implementation, the BS 130 communicates with respective trunked mobile interfaces 215 of the MRSs 110 in compliance with any known land-mobile radio (LMR) wireless communication standard, and can employ multiple access technologies and protocols described in those standards. For example, in one implementation, the BS 130 can communicate with a first trunked mobile interface 215 of the first MRS 110-1, and a second trunked mobile interface 215 of the second MRS 110-2. In one implementation, the respective trunked mobile interfaces 215 can be APCO P25 compliant interfaces.

The BS 130 is coupled to the trunking system 150 of the fixed network equipment (FNE) 155 via a communication link 140, and communicates with the trunking system 150 of the fixed network equipment 155 over communication link 140, which can be either a wired or wireless communication link depending on the implementation. The BS 130 and the trunking system 150 of the fixed network equipment 155 can also be compliant with any known wireless LMR communication standards. For example, in one implementation, the BS 130 can be an APCO 25 compliant BS that communicates in accordance with an APCO 25 standards.

As illustrated in FIGS. 5B-5C, after the WLAN communication link is established, a system network connection (also referred to as a "backhaul communication link") can be set up between the ad hoc trunked site 115 and the trunking system 150 via the BS 130 that directly communicates with the trunking system 150 of fixed network equipment 155. In particular, the backhaul communication link of this embodiment includes the network-to-repeater (N/R) RF link 127 (used for communication between the MRS 110-1 and the BS 130), and the communication link 140 (from the BS 130 to the trunking system 150).

A control channel 192 can be established over the backhaul communication link between the SUs 120 and the trunking system 150, as illustrated in FIG. 5B by the double-ended arrow that extends between the trunking system 150 and the SU 120-1. In FIG. 5B, the MRS 110-1 communicates with a BS 130 (and indirectly with the trunking system 150) over a link 127 that is used to carry communications associated with the control channel, and with SUs 120 over other RF links that are used to carry communications associated with the control channel. The control channel is a logical channel that transports control information over a path between two network endpoints. The path can include any number of communications links. Thus, physically distinct communication links (e.g., link 140, link 127 and RF links) are used to implement the control channel, and for sake of readability, the physically distinct communication links over which the control channel is implemented will be referred to below simply as the control channel 192.

The MRS 110-1 serves as a relay between the SUs 120 and the trunking system 150. The trunked mobile interface 215 (FIG. 2) of the MRS 110-1 is tuned to a frequency of the control channel of the base station 130. Information that is received by the trunked mobile interface 215 (FIG. 2) of the MRS 110-1 is relayed to the repeater interface 210 (FIG. 2) of the MRS 110-1 and retransmitted to the SUs 120 that are tuned to the control channel assigned to the MRS 110-1. The SUs 120 can process the information in accordance with the trunking system's protocol.

Information that is transmitted by the SUs 120 can be received by the repeater interface 210 (FIG. 2) of the MRS 110-1, and relayed to the trunked mobile interface 215 (FIG. 2) of the MRS 110-1. The trunked mobile interface 215 transmits the information to the base station 130, where the information is processed according to that trunking system's protocol.

In response to a channel request, at least one traffic channel 194 can be established over the backhaul communication link between the SUs 120 and the trunking system 150, as illustrated in FIG. 5C by the double-ended arrow that extends between the trunking system 150 and the SU 120-1. The channel request can originate from any source in the trunking system 155 including the SUs 120, a dispatcher connected to the trunking system 150, or another subscriber unit in the trunking system 155. In FIG. 5C, the MRS 110-2 communicates with a BS 130 (and indirectly with the trunking system 150 of the FNE 155) over a link 127 that is used to carry communications associated with the traffic channel, and with SUs 120 over other RF links that are used to carry communications associated with the traffic channel. A traffic channel is a logical channel that transports traffic information over a path between two network endpoints. The path can include any number of communications links. Thus, physically distinct communication links (e.g., link 140, link 127 and RF links) are used to implement each traffic channel, and for sake of readability, the physically distinct communication links (that are used to implement each traffic channel) will be referred to below as the traffic channel 194.

After MRS 110-1 receives a channel grant from the trunking system 150 through base station 130, MRS 110-1 provides instructions, over its repeater interface 210 (FIG. 2), to the SUs 120 to switch to the traffic channel that is assigned to repeater interface 210 of MRS 110-2, and also provides instructions to the trunked mobile interface of MRS 110-2 to switch to the traffic channel granted by the trunking system 150. After the MRS 110-2 and SUs 120 have switched to their respective traffic channels, traffic between the trunking system 150 and the SUs 120 can be relayed using the repeater interface 210 and the trunked mobile interface 215 of the MRS 110-2.

Figure 5D:
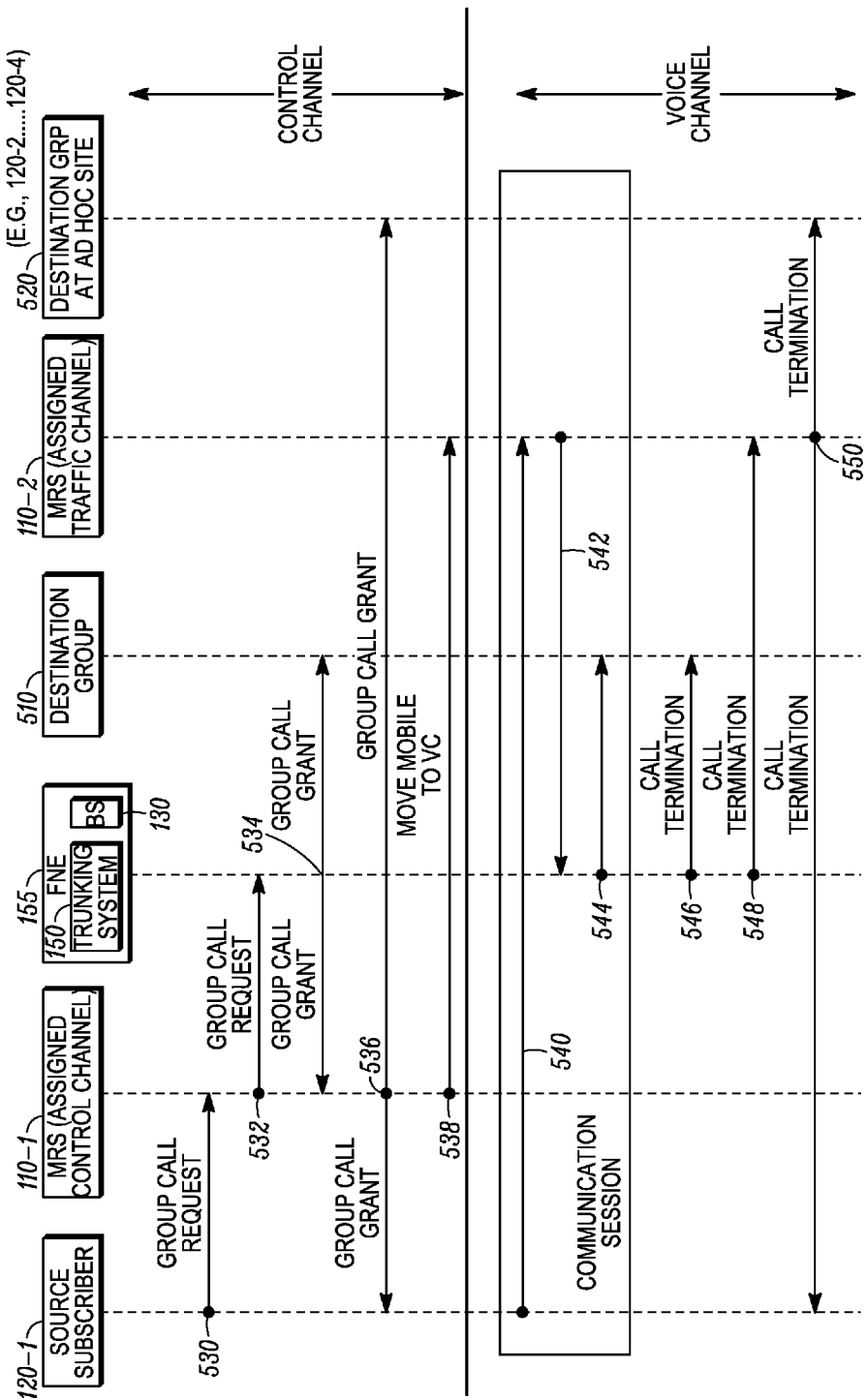
FIG. 5D is a call flow diagram that illustrates the flow of a group call in accordance with some embodiments.
Figure 5E:
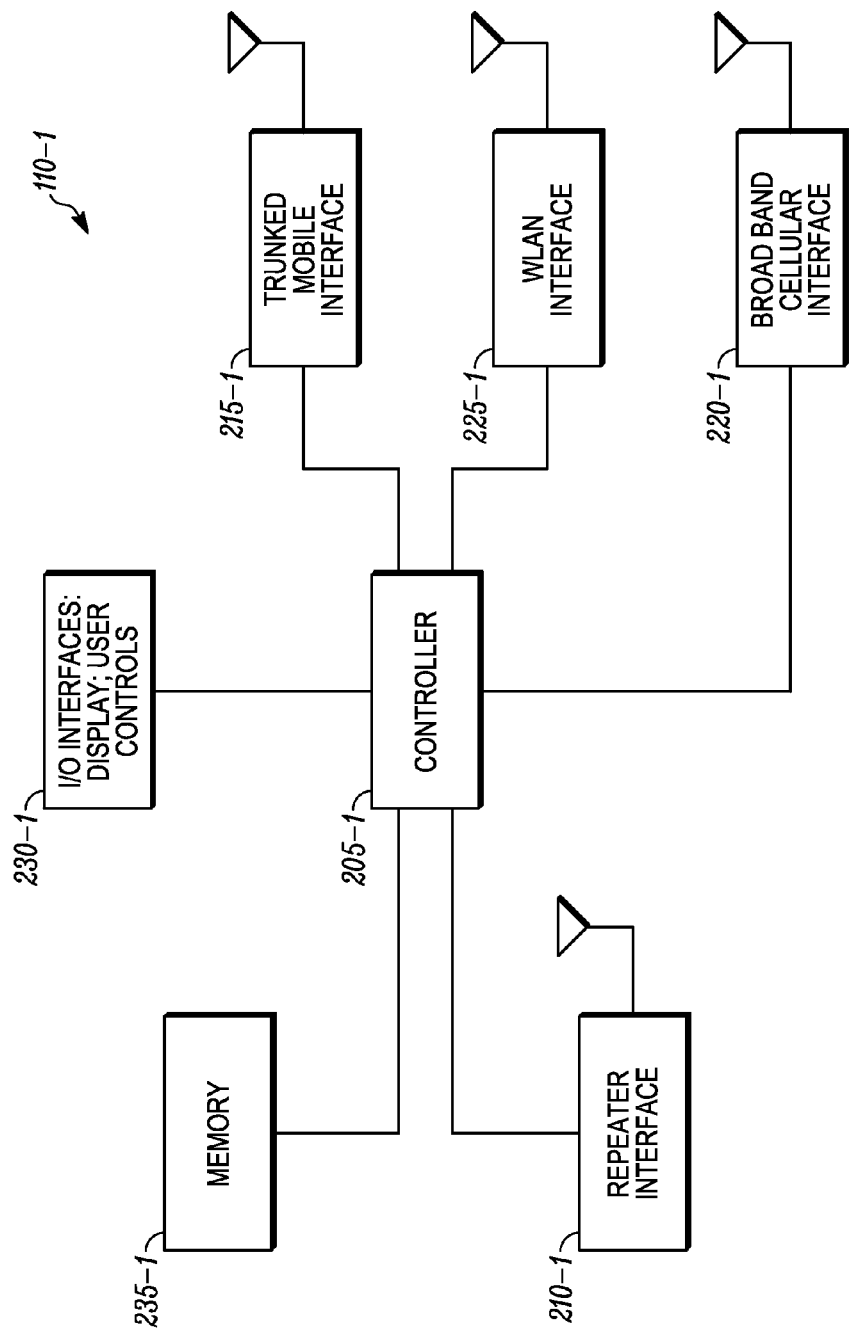
FIGS. 5E and 5F are block diagrams of Mobile Repeater Systems (MRSs) in accordance with some embodiments.
Figure 5F:
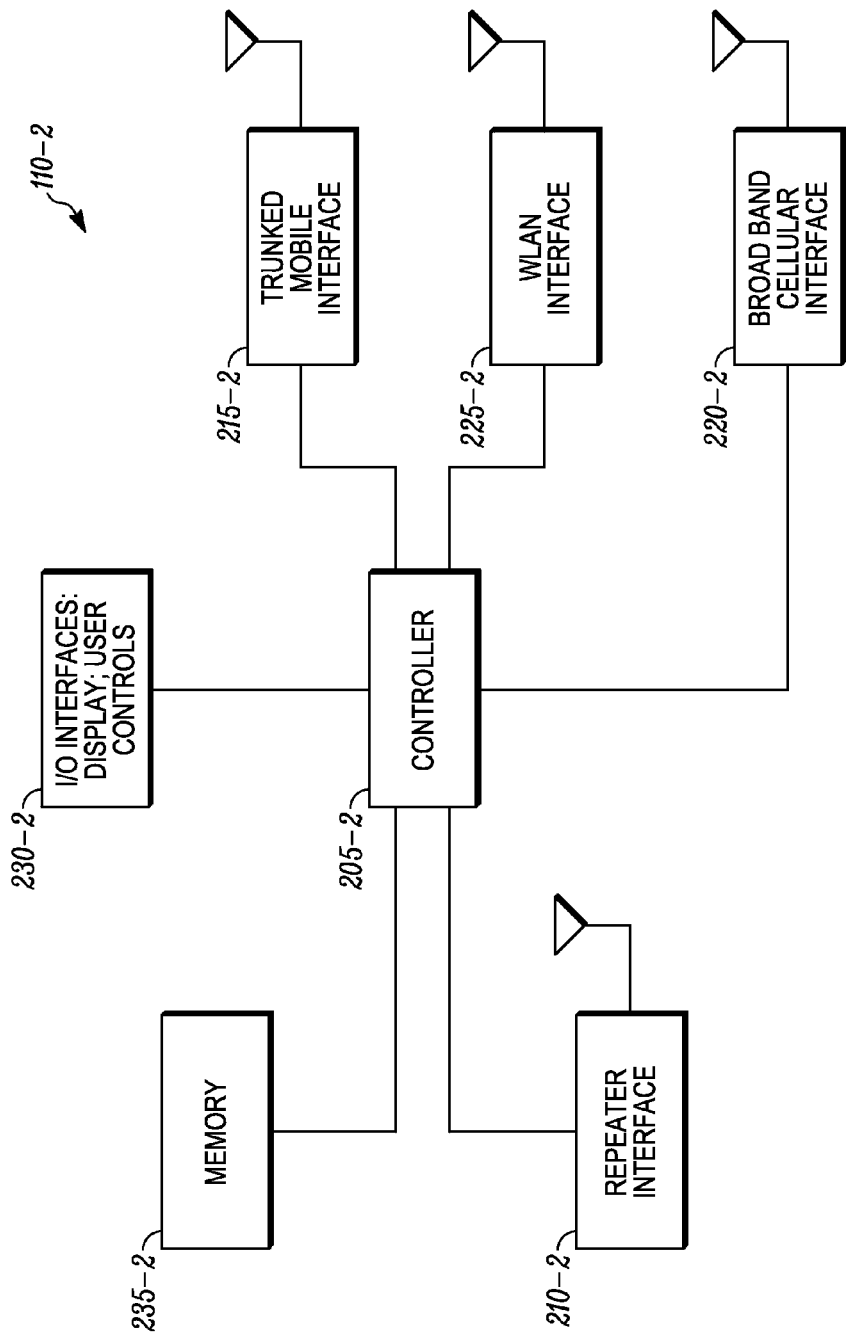

FIG. 5D is a call flow diagram that illustrates the flow of a group call in accordance with some embodiments, and will be described below with reference to FIGS. 5E and 5F that illustrate block diagrams of MRSs 110-1, 110-2, respectively, in accordance with some embodiments. In this configuration the ad hoc trunked site 115 serves as an extension to a nearby trunked site 155 that cannot provide complete coverage. In this situation, the ad hoc trunked site 115 is created and SUs 120 begin to affiliate with the ad hoc trunked site 115. Prior to describing FIG. 5D, it's noted that the first MRS 110-1, which provides the control channel, and the second MRS 110-2, which is assigned to provide a voice/traffic channel, each have the interfaces 210, 215, 220, 225 that are described above with reference to FIG. 2. To differentiate between these interfaces in the description of FIG. 5D, the interfaces of the first MRS 110-1 will be designated as interfaces 210-1, 215-1, 220-1, and 225-1, as illustrated in FIG. 5E, whereas the corresponding interfaces of MRS 110-2 will be designated as interfaces 210-2, 215-2, 220-2, and 225-2, as illustrated in FIG. 5F. In addition, the mobile trunked interface 215-1 of MRS 110-1 communicates with a BS 130 (and indirectly with the trunking system 150) over a control channel, the repeater interface 210-1 of MRS 110-1 communicates with SUs 120 over the control channel, the mobile trunked interface 215-2 of MRS 110-2 communicates with a BS 130 (and indirectly with the trunking system 150 of the FNE 155) over a traffic channel, and the repeater interface 210-2 of MRS 110-2 communicates with SUs 120 over the traffic channel.

The group call flow begins at 530, when the source SU 120-1 makes a group call request by communicating a group call request message to the first MRS 110-1, which is the MRS that is providing the control channel at the ad hoc trunked site 115.

At 532, a trunked mobile interface 215-1 (FIG. 5E) of the first MRS 110-1 forwards the group call request message to the base station 130 over a control channel, and the base station 130 forwards the group call request message to the trunking system 150 over the control channel.

At 534, the trunking system 150 generates a group call grant message that it transmits to members of a destination talk group 510 in the trunking system 155, which also includes the mobile trunked interface 215-1 of the first MRS 110-1. The first MRS 110-1 is a proxy for the destination talk group 520 affiliated with the control channel transmitted by the repeater interface 210-1 of the MRS 110-1.

At 536, the repeater interface 210-1 of the first MRS 110-1 forwards the group call grant message to the source SU 120-1, and any other SUs in destination talk group 520 on the control channel, identifying the traffic channel that the repeater interface 210-2 of the assigned traffic channel MRS 110-2 is operating on.

In conjunction with 536, at 538, the first MRS 110-1 sends (via its WLAN interface 225-1) a communication that informs MRS 110-2 to switch its trunked mobile interface 215-2 to communicate on the channel granted by the trunking system 150 and begin repeater interface operation on its repeater interface 210-2.

A communication session (e.g., conversation that is part of a group call) can then begin between the SUs that are affiliated with the talk group. In the example illustrated in FIG. 5D, at 540, a source SU 120-1 begins voice/traffic transmissions to MRS 110-2. At 542, the other SUs 120 that belong to the destination talk group 520 can then receive the voice/traffic transmissions over the traffic channel that is implemented via the second MRS 110-2. As such, SUs that are affiliated with the second MRS 110-2 will receive and process transmissions from the repeater interface 210-2 of the second MRS 110-2.

At 544, any other SUs that are members of the group, but not present at the ad hoc site 115, can receive repeated transmissions transmitted through the trunked mobile interface 215-2 of the second MRS 110-2 and the trunking system 150. In other words, any SUs in the talk group that are within the coverage of the FNE 155 (but not within coverage of the MRSs) will also be able to receive and process voice/traffic transmissions communicated during the communication session and can participate in the communication session as if all of those SUs were in the communication range of the FNE 155.

When the communication session ends, the trunking system 150 of the FNE 155 generates a call termination message at 546 and all of the SUs that are participating in the call within the trunking system 150 of the FNE 155 coverage (that receive the call termination message) return to their respective control channels.

At 548, the same call termination message is received by the trunked mobile interface 215-2 (FIG. 5F) of MRS 110-2, which in turn forwards that same call termination message to the repeater interface 210-2 of MRS 110-2.

At 550, the repeater interface 210-2 of MRS 110-2 forwards the call termination message to the source subscriber 120-1 and the other SUs 520 (e.g., 120-2 . . . 120-4) located within communication range of the ad hoc trunked site 115. The SU's 120-1 and the other SUs 520 located within communication range of the ad hoc trunked site 115 return to the control channel provided by MRS 110-1 for the ad hoc trunked site 115.

Figure 6A:
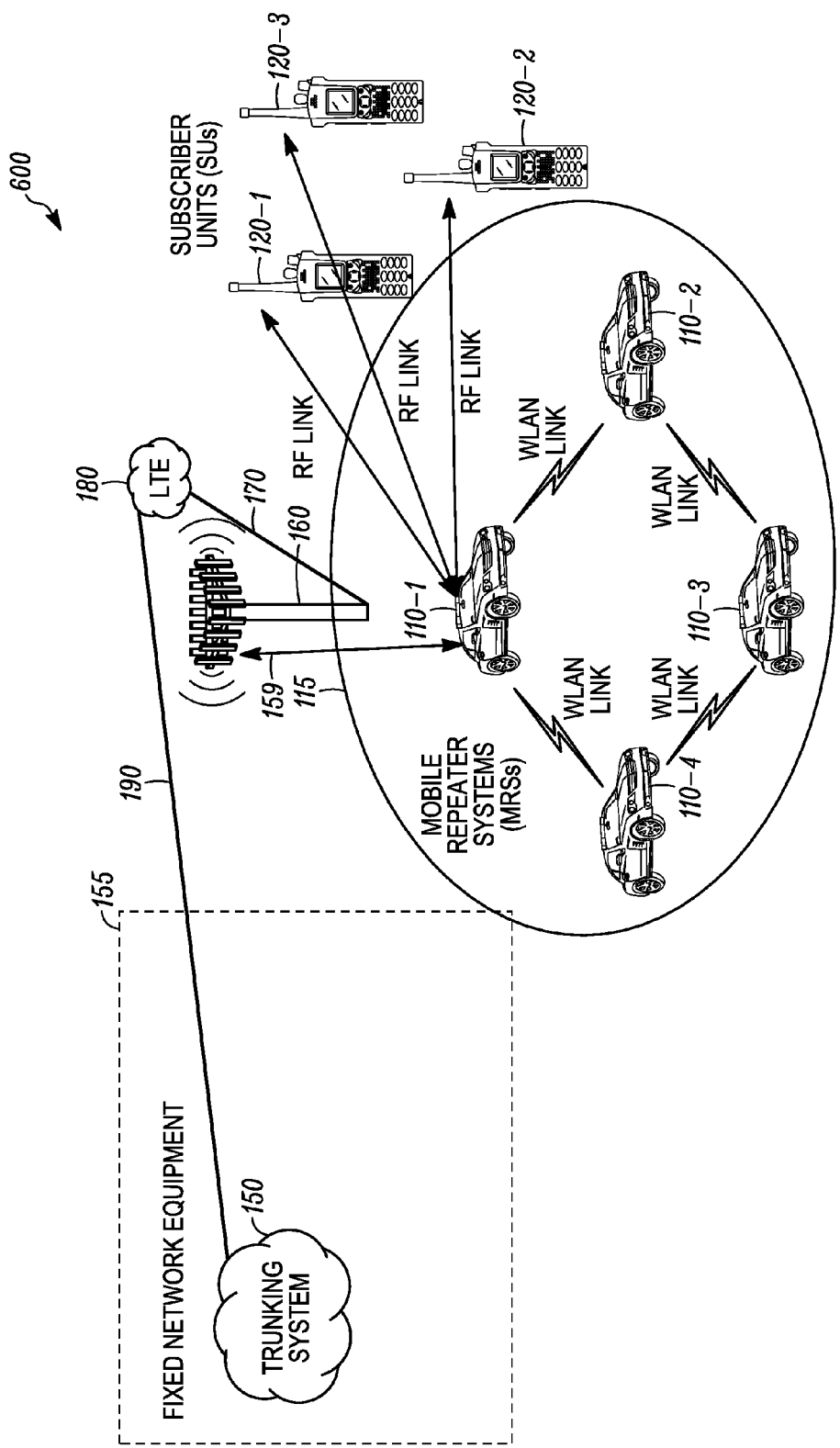
FIGS. 6A-6C are a series of diagrams of a trunked communication network that implements Mobile Repeater Systems (MRSs) in accordance with some other embodiments.
Figure 6B:
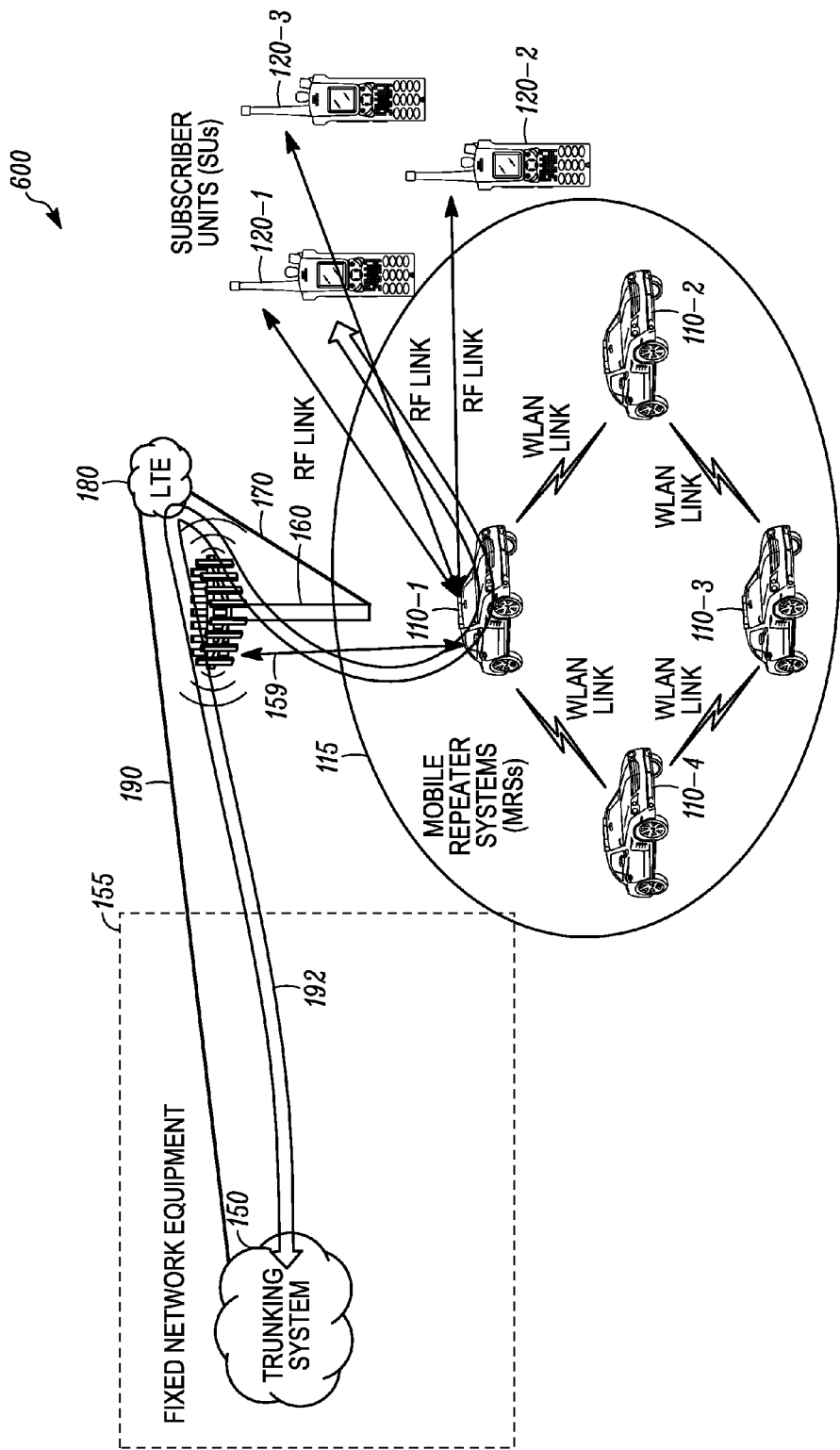
Figure 6C:
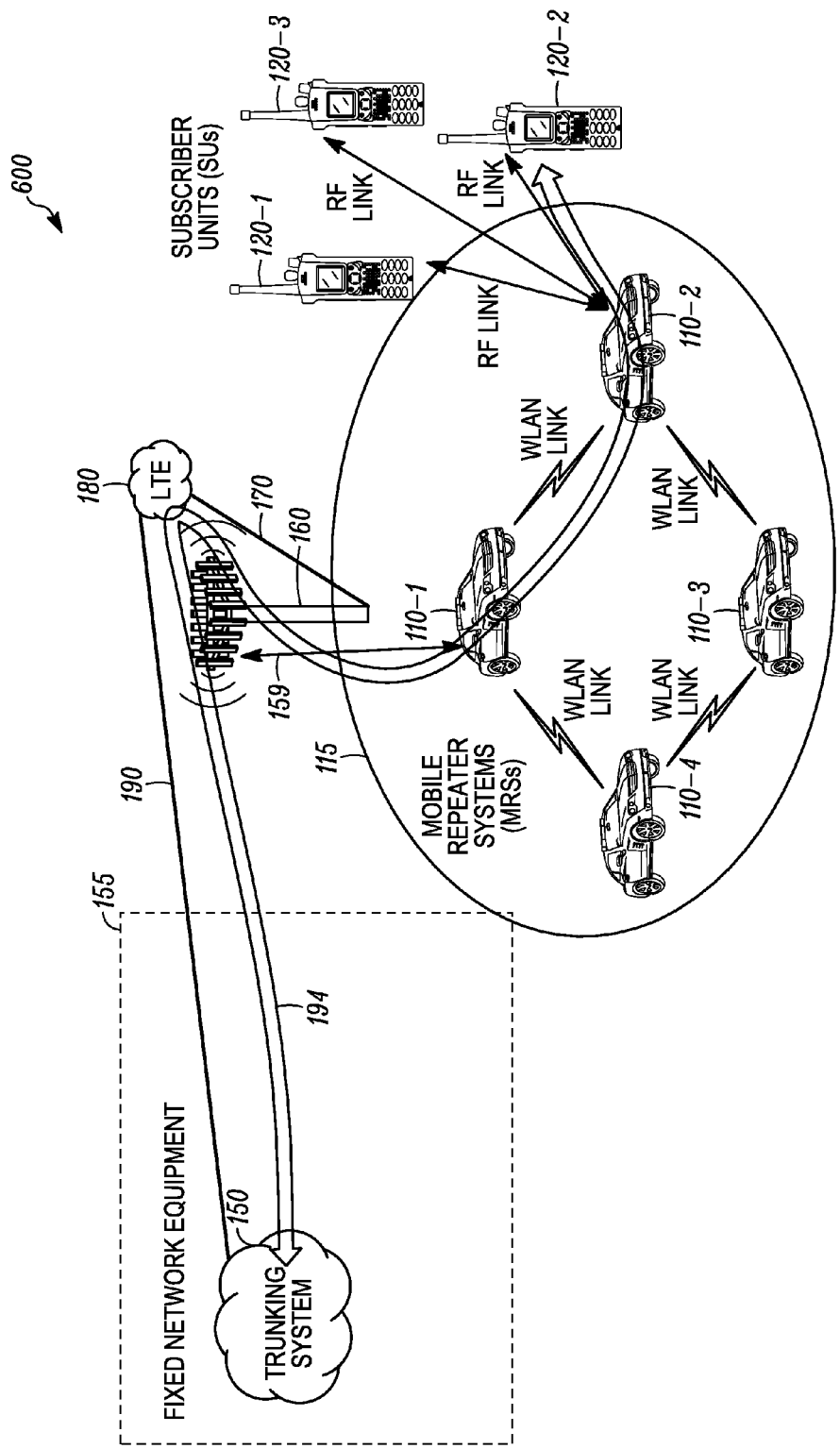

FIGS. 6A-6C are a series of diagrams of a trunked communication network 600 that implements Mobile Repeater Systems (MRSs) 110 in accordance with some embodiments. For sake of brevity, details of FIGS. 1 and 4A-4C that are also illustrated in FIGS. 6A-6C will not be described again.

As illustrated in FIG. 6A, the trunked communication network 600 includes a cellular BS 160 that is coupled to a core network 180 via communication link 170. The MRS 110-1 communicates with the cellular BS 160 over a cellular RF link 159, the cellular BS 160 communicates with a core network 180 via communication link 170, and the core network 180 is coupled to the trunking system 150 of the fixed network equipment 155 over communication link 190.

In one non-limiting exemplary implementation, the cellular BS 160 communicates with broadband modem interfaces 220 of the MRSs 110 in compliance with a known wireless communication standard, and can employ multiple access technologies and protocols described in those standards. Similarly, the cellular BS 160 and the core network 180 can also be compliant with such wireless communication standards.

As illustrated in FIGS. 6B-6C, a backhaul communication link can be established between the ad hoc trunked site 115 and a cellular BS 160 that indirectly communicates with the trunking system 150 (e.g., of a APCO 25 network) over a core network 180. In particular, the backhaul communication link of this embodiment includes the cellular RF link 159 (used for communication between the MRS 110-1 and a cellular BS 160), the communication link 170 (from the cellular BS 160 to the core network 180), and the communication link 190 (from the core network 180 to the trunking system 150 of the fixed network equipment 155). A control channel 192 can be established over the backhaul communication link between the SUs 120 and the trunking system 150, as illustrated in FIG. 6B by the double-ended arrow that extends between the SU 120-1 and the trunking system 150. The MRS 110-1 communicates with the cellular BS 160 (and indirectly with the trunking system 150) over a link 159 that is used to carry communications associated with the control channel, and with SUs 120 over other RF links that are used to carry communications associated with the control channel. As described above with reference to FIG. 5B, in FIG. 6B, the control channel is a logical channel that transports control information over a path between two network endpoints. The path can include any number of communications links. Thus, physically distinct communication links (e.g., link 190, link 170, link 159 and RF links) are used to implement the control channel, and for sake of readability, these physically distinct communication links over which the control channel is implemented will be referred to below as the control channel 192.

To explain further, the MRS 110-1 serves as a relay between the SUs 120 and the trunking system 150. The broadband cellular interface 230 (FIG. 2) of the MRS 110-1 communicates with the cellular base station 160 that is connected to the trunking system 150 of the FNE 155 through the core network 180 and backhaul link 190. Information that is received by the broadband cellular interface 230 (FIG. 2) of the MRS 110-1 is relayed to the repeater interface 210 (FIG. 2) of the MRS 110-1, and then retransmitted to the SUs 120 that are tuned to the control channel that is assigned to the MRS 110-1. The SUs 120 can process the information in accordance with the trunked system's protocol. Information that is transmitted by the SUs 120 are received by the repeater interface 210 (FIG. 2) of the MRS 110-1, and relayed to the repeater interface 210. The repeater interface 210 relays the information to the broadband cellular interface 230 (FIG. 2) of the MRS 110-1. The broadband cellular interface 230 transmits the information to the trunking system 150 of the FNE 155, through the cellular base station 160, core network 180 and backhaul link 190. At the trunking system 150, the information is processed according to the trunking system's protocol.

In response to a channel request, at least one traffic channel 194 can be established over the backhaul communication link between the SUs 120 and the FNE 155, as illustrated in FIG. 6C by the double-ended arrow that extends between the SU 120-1 and the trunking system 150. The channel request can originate from any source in the trunked communication network 600 including the SUs 120, a dispatcher connected to the trunking system 150, or another subscriber unit in the trunking system 155. The MRS 110-2 communicates with the cellular BS 160 (and indirectly with the trunking system 150 of the FNE 155) over a link 159 that is used to carry communications associated with the traffic channel, and with SUs 120 over other RF links that are used to carry communications associated with the traffic channel. As described above with reference to FIG. 5C, in FIG. 6C, a traffic channel is a logical channel that transports traffic information over a path between two network endpoints. The path can include any number of communications links. Thus, physically distinct communication links (e.g., link 190, link 170, link 159 and RF links) are used to implement each traffic channel, and for sake of readability, the physically distinct communication links that are used to implement each traffic channel will be referred to below as the traffic channel 194.

After the control channel MRS 110-1 receives a channel grant from the trunking system 150 through cellular base station 160, MRS 110-1 provides instructions, over its repeater interface 210 (FIG. 2), to switch to the traffic channel that is assigned to repeater interface 210 of the assigned traffic channel MRS 110-2.

After the MRS 110-2 and SUs 120 have switched to their respective traffic channels, the MRS 110-1 can relay control information via its broadband cellular interface 220 and WLAN interface 225, and the MRS 110-2 can relay traffic via its repeater interface 210 and WLAN interface 225.

The MRS 110-1 can relay control information between the trunking system 150 and the SUs 120. For example, the MRS 110-1 can receive control information from the SUs 120 via its repeater interface 210 and can then communicate the control information to the broadband cellular interface 230. The broadband cellular interface 230 of MRS 110-1 then communicates the control information to the cellular base station 160. The cellular base station 160 communicates the control information to core network 180 over link 170, and the core network 180 communicates the control information the trunking system 150 over the backhaul link 190. By contrast, for communications that originate from the trunking system 150, the core network 180 can receive control information communicated from the trunking system 150 over the backhaul link 190, and can communicate that control information to the cellular base station 160 communicates over link 170. The broadband cellular interface 230 of MRS 110-1 receives the control information from the cellular base station 160, and passes it to its repeater interface 210. The repeater interface 210 of MRS 110-1 then communicates the control information to the SUs 120.

Similarly, the MRS 110-2 can relay traffic between the trunking system 150 and the SUs 120. For example, the MRS 110-2 can receive traffic from the SUs 120 via the repeater interface 210 and forward it to the WLAN interface 225. The WLAN interface 225 of MRS 110-2 can then communicate the traffic to the WLAN interface of MRS 110-1. The WLAN interface of MRS 110-1 forwards this traffic to the broadband cellular interface 230, and the broadband cellular interface communicates the traffic to the cellular base station 160. The cellular base station 160 communicates the traffic to core network 180 over link 170, and the core network 180 communicates the traffic the trunking system 150 over the backhaul link 190. By contrast, for communications that originate from the trunking system 150, the core network 180 can receive traffic communicated from the trunking system 150 over the backhaul link 190, and can communicate that traffic to the cellular base station 160 communicates over link 170. The broadband cellular interface 230 of MRS 110-1 receives the traffic from the cellular base station 160, and passes it to its WLAN interface 225. The WLAN interface 225 of MRS 110-1 then communicates the traffic to the WLAN interface 225 of MRS 110-2. The WLAN interface 225 of MRS 110-2 can then pass this traffic to its repeater interface 210 and re-transmit it to the SUs 120.

Figure 6D:
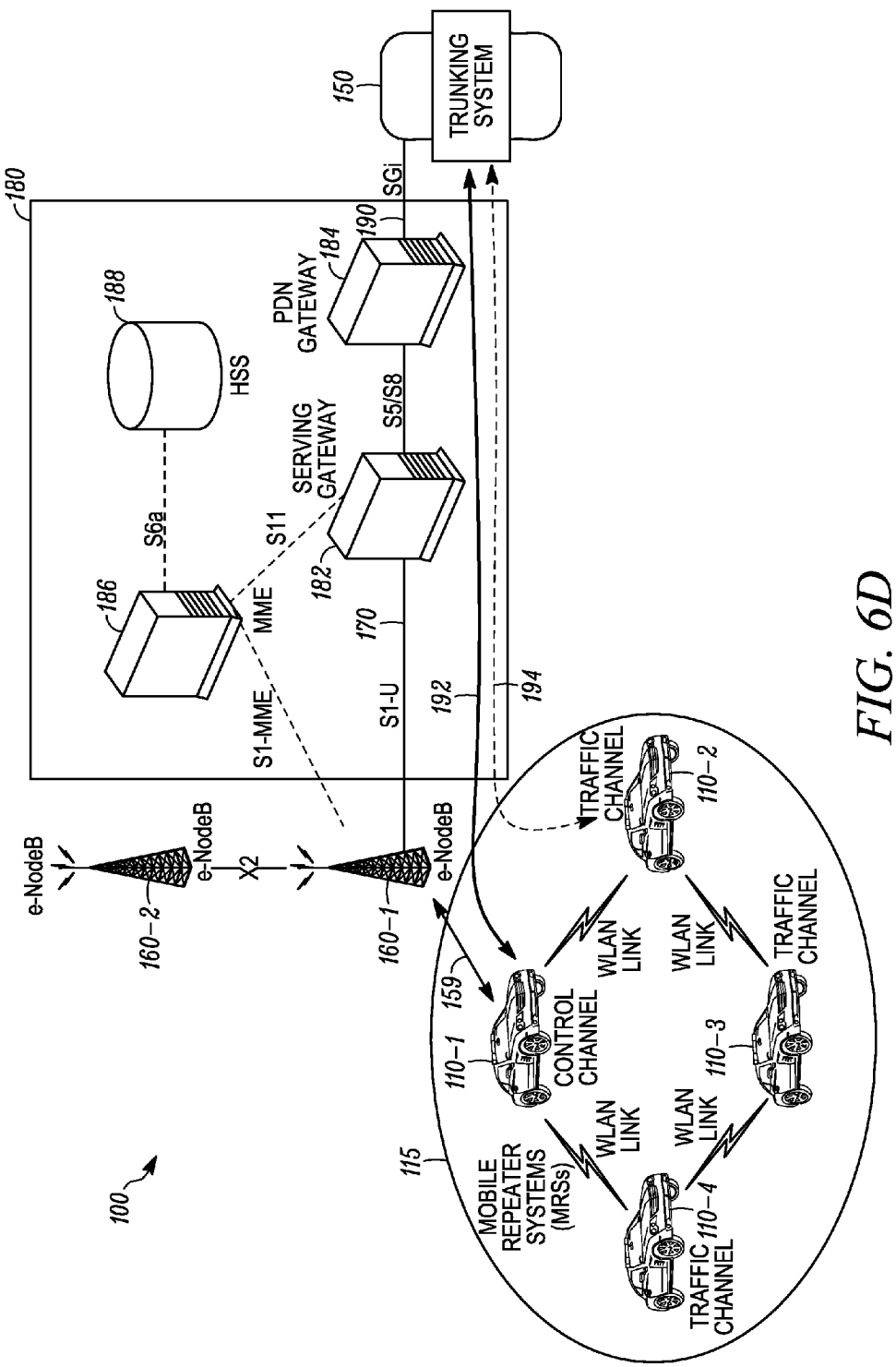
FIG. 6D is a diagram of one non-limiting, exemplary implementation of the trunked communication network illustrated in FIGS. 6A-6C, in which a cellular base station and core network are compliant with the Long Term Evolution (LTE) wireless communication standards.

FIG. 6D is a diagram of one exemplary implementation of the trunked communication network 600 illustrated in FIGS. 6A-6C. FIG. 6D illustrates one non-limiting example, in which the cellular BS 160 and core network 180 are compliant with the Long Term Evolution (LTE) wireless communication standards, and employ any of the multiple access technologies, communication protocols, modulation and coding schemes that are described in conjunction with those standards.

As will be appreciated by those skilled in the art, the Long Term Evolution (LTE) is a radio technology designed to increase the capacity and speed of mobile telephone networks and provide for an end-to-end Internet Protocol (IP) service delivery of media to help support the demands for multimedia services that are already experienced in wired networks. Currently, LTE comprises a set of enhancements to the Universal Mobile Telecommunications System (UMTS), which is described in a suite of Technical Specifications (TS) developed within and publicized by Third ($3^{rd}$) Generation Partnership Project (3GPP), with the most recent version of the 3GPP Technical Standards (TSs) being published in March 2011. Copies of the 3GPP TSs can be obtained by writing to 3GPP Mobile Competence Centre (c/o ETSI), 650, route des Lucioles, 06921 Sophia-Antipolis Cedex, FRANCE. In other embodiments, technologies that are described in conjunction with any other known standards can be implemented so long as the air interface (or cellular link 170) can meet a minimum data rate required for the backhaul to work properly. It is envisioned that some examples of such standards can include, for example, Worldwide Interoperability for Microwave Access (WiMAX) and older standard wireless technologies such as cdmaOne, W-CDMA (UMTS), and CDMA2000, etc.

FIG. 6D also illustrates implementation details of the LTE core network 180 and bearer setup between the fixed network equipment 155 and the Mobile Repeater Systems (MRSs) 110 in accordance with one implementation of the disclosed embodiments.

The network 600 includes a core network 180 (referred to below as an LTE Evolved Packet Core (EPC) 180), a plurality of LTE BSs called "eNodeBs" 160-1 . . . 160-2, a plurality of MRSs 110-1 . . . 110-4, and fixed network equipment 155. Together the MRSs 110 and eNodeBs 160 make up an LTE Evolved Universal Terrestrial Radio Access Network (E-UTRAN). In general, the EPC 180 and the E-UTRAN can be referred to collectively as an LTE system, LTE communication system, or Evolved Packet System (EPS) and can be referred to as such interchangeably herein. Also, it is noted that while, in this example, the radio access network is described as being a LTE E-UTRAN, some embodiments can apply in the context of other types of access networks, including fourth generation (4G) radio access networks such as a WiMAX radio access network.

It is noted that the MRSs 110 and eNodeBs 160 (and any other E-UTRAN elements), the EPC 180 (and the various logical entities or devices that it includes), and the fixed network equipment 155 implement protocols and signaling in compliance with 3GPP Technical Standards.

In general, the EPC 180 (and its various logical entities or devices), eNodeBs 160-1 . . . 160-5, MRSs 110-1 . . . 110-4, and the fixed network equipment 155 are each implemented using (although not shown) a memory, one or more network interfaces, and a processing device that are operatively coupled, and which when programmed form the means for these system elements to implement their desired functionality, for example, as illustrated by reference to the drawings that will be described below. The network interfaces are used for passing signaling, also referred to herein as messaging (e.g., messages, packets, datagrams, frames, superframes, and the like), between the elements of the system. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless over-the-air interfaces. Some of the functionality of the processing, modulating, and transceiver elements may be performed by means of the processing device through programmed logic such as software applications or firmware stored on the memory device of the system element or through hardware.

The processors utilized by the EPC 180 (and its various logical entities or devices), eNodeBs 160-1 . . . 160-5, MRSs 110-1 . . . 110-4, and the fixed network equipment 155 may be programmed with software or firmware logic or code for performing functionality described by reference to the drawings that will be described below; and/or the processing device may be implemented in hardware, for example, as a state machine or ASIC (application specific integrated circuit) to perform such functionality. The memory implemented by these system elements can include short-term and/or long-term storage of various information needed for the functioning of the respective elements. The memory may further store software or firmware for programming the processing device with the logic or code needed to perform its functionality.

A brief overview description of some of the functionality of the EPC 180 (and its various logical entities or devices), eNodeBs 160-1 . . . 160-5, MRSs 110-1 . . . 110-4, and the trunking system 150 shown in FIG. 6D will now be provided.

The EPC 180 is an all-IP core network that provides mobile core functionality that, in previous mobile generations (2G, 3G), has been realized through two separate sub-domains: circuit-switched (CS) for voice and packet-switched (PS) for data. The EPC 180 enables the above-mentioned all IP end-to-end delivery of media: from MRSs 110 with embedded IP capabilities, over IP-based eNodeBs 160, across the EPC 180 and throughout the application domain.

In this embodiment, the eNodeBs 160 serve as the intermediate infrastructure device between the MRSs and the EPC 180 and a point of access for the MRSs to their assigned or allocated bearers. Each eNodeB can be associated with one or more cells that represents a geographic coverage area that provides the wireless resources or "bearers" for carrying data to/from MRSs that are connected to the E-UTRAN. In one implementation, each of the eNodeBs 160 includes three cells, and each of the eNodeBs 160 has roughly the same coverage area; however, in other implementations, the number of cells per eNodeB coverage area may be one or more, and the coverage areas of each eNodeB can vary.

The trunking system 150 facilitates transport of media (e.g., voice, data, video, etc.) from one or more source applications to one or more destination MRSs 110 over the LTE system. As such, the trunking system 150 can include, for instance, a computer aided dispatch (CAD) server, a media server, a call controller, etc. In one illustrative embodiment, trunking system 150 provides application layer services to MRSs 110 connected to the E-UTRAN that are authorized and have the capabilities to use these services. As an example, the trunking system 150 can provide services that include, but are not limited to, push-to-talk (PTT) call services, Push-to-Video (PTV) services, Push-to-anything (PTX) services, etc. to the MRSs 110. The trunking system 150 can operate in conjunction with the EPC 180 to assign "bearers" used to transport media to/from the MRSs 110.

As used herein, the term "bearer" refers to a logical transmission path or link established between two points in a network (e.g., between MRSs and the EPC 180). A bearer is used to carry user or control data (also referred to as traffic) through the network either to or from MRSs. Each bearer has a certain set of characteristics or attributes associated therewith including, but not limited to, a Modulation and Coding Scheme level, a Quality of Service (QoS), a carrier frequency at which data is modulated, a particular bandwidth, bit rate, etc. In addition, a bearer can be bidirectional, e.g., having both an uplink path from the MRS to the trunking system 150 and a downlink path from the fixed network equipment 155 to the MRSs 110; or a bearer can be unidirectional. Bearers can also be either point-to-point (PTP) unicast bearers, or point-to-multipoint (PTM) bearer.

FIG. 6D further illustrates the logical entities or elements or devices 182, 184, 186, 188 that can be implemented within the EPC 180. More specifically, in this implementation, the EPC 180 includes a Serving Gateway (SGW) 182, a Packet Data Network Gateway (PDN GW) 184, a Mobility Management Entity (MME) 186, and subscriber databases (HSS) 188. The EPC 180 also includes various interfaces (also referred to in the art as reference points) between the logical entities that are defined in the LTE standards, but are not labeled in FIG. 3 for sake of simplicity. Additional known elements and interfaces in an EPC as described in the 3GPP TSs for LTE are not shown in FIG. 3 for the sake of clarity.

Moreover, although the logical entities 182, 184, 186, 188 of the EPC 180 are shown as separate logical blocks in FIG. 6D, it is noted that while each can be implemented in separate hardware devices, in other implementations, the logical entities 182, 184, 186, 188 can be combined and implemented in one or more hardware devices.

Each of the logical entities 182, 184, 186, 188 of FIG. 6D will now be described in greater detail.

The MME 186 is a logical entity or device that serves as the key control-node for MRS access on the LTE E-UTRAN. The MME 186 is involved in the bearer activation/deactivation process and supports functions related to bearer and connection management. The MME 186 is further responsible for choosing the SGW 182 for a MRS at the time of initial attachment, and at time of intra-LTE handover. The MME 186 is also responsible for idle mode MRS tracking and paging procedure including retransmissions. The MME 186 is further responsible for authenticating the user by interacting with a Home Subscriber Server (HSS) 188. The MME 186 is also responsible for generation and allocation of temporary identities or identifiers to MREs.

The SGW 182 is a logical entity or device that routes and forwards data packets. For example, the SGW 182 can support user data and provides routing and forwarding functionality between the eNodeB and Packet Data Network (PDN). The SGW 182 also serves as a mobility anchor point (e.g., fixed connection route during a communication session) for the user plane during for handovers between eNBs (inter-eNB handovers), and as a mobility anchor point for inter-3GPP mobility (e.g., between LTE and other 3GPP networks). There are also links 170 between the SGW 182 and the eNodeBs for transporting media as well as others that are not shown in FIG. 6D for the purpose of simplifying the diagram. The SGW 182 monitors and maintains context information related to the MRSs and generates paging requests when data for the MRS arrives from the network. For idle state MRSs, the SGW 182 terminates the DL data path and triggers paging when DL data arrives for the MRS. It manages and stores MRS contexts, e.g. parameters of the IP bearer service, network internal routing information.

The PDN GW 184 is a logical entity or device that provides connectivity to the MRSs to external packet data networks (PDNs) by being the point of exit and entry of traffic for the MRSs. A MRS may have simultaneous connectivity with more than one PDN GW 184 for accessing multiple PDNs. Among other things, the PDN GW 184 performs policy enforcement, packet filtering for each user.

Communications between the ad hoc trunked site 115 and the trunking system 150 can take place over two distinct types of communication bearers. Both bearers can be bidirectional. As illustrated in FIG. 6D, guaranteed bit rate (GBR) bearer 194 is used for user plane transport of traffic information (e.g., user plane packets such as voice packets) between the LTE BS 160 (also known in the art as an eNodeB) and the trunking system 150. The GBR bearer 194 can be dimensioned to accommodate a number of traffic channels that will be available at the site 115 times the bit rate of a single traffic channel.

By contrast, a non-GBR bearer 192 is used for control plane transport of control plane information (e.g., signaling) between the LTE BS 160 and the trunking system 150. The information carried by this bearer 192 may be time critical.

FIG. 6E is a table that provides further details regarding GBR and non-GBR bearers that are employed in accordance with some of the disclosed embodiments. As shown in FIG. 6E, the GBR bearers are typically associated with high priority services with shorter packet delay budgets such as conversational voice, conversational video (live streaming), non-conversational video (buffered streaming), real time gaming, etc., whereas non-GBR bearers are typically associated with lower priority services with longer packet delay budgets such as signaling, live streaming of voice/video, interactive gaming, buffered streaming of video and other TCP-based services, etc.

The Quality of Service (QoS) for the LTE bearers 192, 194 can vary depending on the implementation. The LTE standard defines QoS class identifiers (QCIs) that determine how a certain data flow (a bearer) will be treated in the LTE system. A table of QCI values is presented in the table of FIG. 6E.

Once the site 115 has been established and the MRS that will provide the control channel has been decided (the first MRS 110-1 in this particular example), an application executed at the first MRS 110-1 can start the registration process for registering the cellular interface 220 (i.e., LTE modem) with the LTE system 180 (assuming it has not already been registered for some other application). Registering the cellular interface 220 with the LTE system 180 automatically establishes a default non-GBR bearer with low priority, normally QCI of 9. Through this default non-GBR bearer, the application executed at the first MRS 110-1 can contact the trunking system 150 of the P25 system and send the parameters of the site 115, such as a number of control and/or traffic channels for example.

An application executed at the trunking system 150 requests the establishment of the bi-directional GBR bearer 194 and the bi-directional non-GBR bearer 192 from the LTE system. In one implementation, the guaranteed bit rate (GBR) bearer 194 can use a QCI of 1, while a non-GBR bearer 192 can use a QCI of 5. Once the bearers 194, 192 are established, the site 115 can begin to function as a trunked site.

It is also noted that in LTE an existing bearer can be modified as needed. For example, if the GBR bearer 194 was initially set for 3 channels or 18 kbps, and it is later determined that the GBR needs to be increased, then an increase of the GBR can be sent to the system.

Conclusion

According to one of the disclosed embodiments, a method is provided that extends the capability of mobile repeaters (MRS) to operate in a trunked fashion. Multiple MRS capable vehicles at an incident scene form an ad hoc trunked site. One of the MRS capable vehicles assumes the control channel role with other MRS capable vehicles assuming the trunked traffic channel role. A WLAN link is established between the MRSs with one of the MRSs providing a control channel while also serving as an access point that establishes a Basic Service Set (BSS) that includes the other MRSs. The ad hoc trunked site can operate as a stand-alone site for establishing connectivity to the trunked core. Once organized, the ad hoc trunked site establishes a system network connection through the vehicle's trunked mobile or through the vehicle's broadband modem.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for creating a local ad-hoc trunked site, the method comprising:
   broadcasting, by a first Mobile Repeater (MR) that is configured to serve as an access point associated with a Basic Service Set (BSS), a Basic Service Set Identifier (BSSID) via a Wireless Local Area Network (WLAN) communication link;
   creating, by the first MR, a local ad hoc trunked site comprising a plurality of Mobile Repeaters (MRs) including the first MR and a second MR, wherein each of the plurality of MRs are communicatively coupled via the WLAN communication link;
   the first MR acting as a control MR and providing a land mobile radio (LMR) control channel for control communications with a plurality of LMR subscriber units; and
   assigning, by the first MR via the WLAN communication link and responsive to the first MR receiving a traffic channel request from a first LMR subscriber unit out of the plurality of LMR subscriber units via the LMR control channel, the second MR to act as a traffic MR and provide a first trunked traffic channel for call communications between the first LMR subscriber unit and one or more other LMR subscriber units out of the plurality of LMR subscriber units.

2. The method according to claim 1, further comprising, after the WLAN communication link is established:
   establishing a system network connection that communicatively couples the first MR to a control channel of the fixed network equipment (FNE).

3. The method according to claim 2, wherein the FNE operates in accordance with an Association of Public-Safety Communications Officials (APCO) Project 25 (P25) communication protocol.

4. The method according to claim 2, wherein the FNE operates in accordance with a Long Term Evolution (LTE) communication protocol.

5. The method according to claim 1, wherein the LMR control channel is implemented using a first pair of assigned frequencies over a first repeater-to-subscriber RF communication link.

6. The method according to claim 5, wherein the first trunked traffic channel is implemented using a second pair of assigned frequencies over a second repeater-to-subscriber RF communication link, wherein the second pair of assigned frequencies is different than the first pair of assigned frequencies.

7. A local ad-hoc trunked site comprising:
   a plurality of Mobile Repeaters (MRs) each being programmed with a Basic Service Set Identifier (BSSID), the plurality of MRs comprising:
      a first MR configured to broadcast, via a Wireless Local Area Network (WLAN) communication link, the BSSID and to serve as an access point that establishes WLAN communication link with each of the other MRs to form a Basic Service Set (BSS), wherein the first MR is further configured to act as a control MR and provide a land mobile radio (LMR) control channel for control communications with a plurality of LMR subscriber units; and
      a second MR configured to join the BSS as a traffic MR;
      wherein the first MR is further configured to, responsive to receiving a traffic channel request from a first LMR subscriber unit out of the plurality of LMR subscriber units via the LMR control channel, assign the second MR, via the WLAN communication link, to act as the traffic MR for the requested traffic channel, and to provide a first trunked traffic channel for call communications between the first subscriber unit and one or more other LMR subscriber units out of the plurality of LMR subscriber units.

8. The local ad-hoc trunked site according to claim 7, further comprising:
   a fixed network equipment (FNE) communicatively coupled to the first MR, wherein the first MR is programmed to establish a control channel connection to the fixed network equipment (FNE).

9. The local ad-hoc trunked site according to claim 7, wherein the LMR control channel is implemented using a first pair of assigned frequencies over a first repeater-to-subscriber RF communication link, and wherein the first trunked traffic channel is implemented using a second pair of assigned frequencies over a second repeater-to-subscriber RF communication link, wherein the second pair of assigned frequencies is different than the first pair of assigned frequencies.

10. The local ad-hoc trunked site according to claim 8, wherein the FNE operates in accordance with an Association of Public-Safety Communications Officials (APCO) Project 25 (P25) communication protocol.

11. The local ad-hoc trunked site according to claim 8, wherein the FNE operates in accordance with a Long Term Evolution (LTE) communication protocol.

12. The local ad-hoc trunked site according to claim 7, wherein control information communicated over the LMR control channel via a first repeater-to-subscriber RF communication link is transported over a first bearer between the cellular base station and the fixed network equipment (FNE), and
   wherein the traffic information communicated over first trunked traffic channel via a second repeater-to-subscriber RF communication link is transported over a guaranteed bit rate (GBR) bearer between the cellular base station and the fixed network equipment (FNE).

13. A method for establishing a network of mobile repeaters to provide local ad-hoc trunked coverage at an incident scene, the method comprising:
   communicating among the mobile repeaters to automatically establish a WLAN communication link with one another;
   then communicating among the mobile repeaters to establish a local trunked site for a plurality of subscriber units, wherein at least one of the mobile repeaters is configured to provide a land mobile radio (LMR) control channel and at least another of the mobile repeaters is configured to provide a LMR traffic channel assignable in response to receiving a request for a traffic channel from a subscriber unit out of the plurality of subscriber units via the LMR control channel; and
   after the mobile repeaters have self-organized to establish the trunked site, automatically establishing a system network connection between at least one of the mobile repeaters and an infrastructure-based network.

\* \* \* \* \*

UNITED STATES PATENT AND TRADEMARK OFFICE
CERTIFICATE OF CORRECTION

PATENT NO. : 9,100,988 B2
APPLICATION NO. : 13/657104
DATED : August 4, 2015
INVENTOR(S) : Roger M. Vilmur et al.

Page 1 of 1

It is certified that error appears in the above-identified patent and that said Letters Patent is hereby corrected as shown below:

IN THE TITLE PAGE:

In Item (72), under "Inventors," in Column 1, Line 3, delete "Gustafson," and insert -- Gustafson, Deceased, --, therefor.

In Item (72), under "Inventors," in Column 1, Line 3, delete "(US);" and insert -- (US); Jody Marie Gustafson, Legal Representative, Oakwood Hills, IL (US); --, therefor.

In Item (72), under "Inventors," in Column 1, Line 5, delete "Gaash" and insert -- Ga'ash --, therefor.

In Item (56), under "OTHER PUBLICATIONS," in Column 2, Line 1, delete "PCT Intematiional" and insert -- PCT International --, therefor.

IN THE SPECIFICATION:

In Column 3, Line 57, delete "non-limiting." and insert -- non-limiting --, therefor.

In Column 6, Line 60, delete "two SUs" and insert -- twoSUs. --, therefor.

In Column 17, Line 27, delete "system 155" and insert -- system 150 --, therefor.

In Column 17, Line 29, delete "trunking system 155." and insert -- trunking system 150. --, therefor.

In Column 18, Line 28, delete "trunking system 155," and insert -- trunking system 150, --, therefor.

In Column 20, Line 31, delete "trunking system 155." and insert -- trunking system 150. --, therefor In Column 24, Line 18, delete "to MREs." and insert -- toMRSs. --, therefor.

Signed and Sealed this
Fifth Day of July, 2016

Michelle K. Lee
*Director of the United States Patent and Trademark Office*